United States Patent [19]
Shiga et al.

[11] Patent Number: 6,005,562
[45] Date of Patent: Dec. 21, 1999

[54] ELECTRONIC PROGRAM GUIDE SYSTEM USING IMAGES OF REDUCED SIZE TO IDENTIFY RESPECTIVE PROGRAMS

[75] Inventors: Tomohisa Shiga; Hideo Terasawa; Yasuaki Yamagishi, all of Kanagawa, Japan

[73] Assignee: Sony Corporation, Tokyo, Japan

[21] Appl. No.: 08/684,387

[22] Filed: Jul. 19, 1996

[30] Foreign Application Priority Data

Jul. 20, 1995 [JP] Japan .................................... 7-183929

[51] Int. Cl.[6] ............................ H04N 7/10; H04N 5/445; H04H 1/00
[52] U.S. Cl. ............................... 345/327; 348/6; 348/10; 348/654; 348/906; 455/6.1; 455/6.2
[58] Field of Search ..................... 348/563, 564, 348/565, 566, 568, 461, 6, 7, 10, 12, 13, 731, 906, 581, 586, 589, 596; 455/2, 4.1, 4.2, 6.1, 5.1, 6.2, 6.3; 345/327; H04N 7/10, 5/50

[56] References Cited

U.S. PATENT DOCUMENTS

| | | | |
|---|---|---|---|
| 5,515,106 | 5/1996 | Chaney et al. | 348/461 |
| 5,594,509 | 1/1997 | Florin et al. | 348/731 |
| 5,659,350 | 8/1997 | Hendricks et al. | 348/6 |
| 5,689,799 | 11/1997 | Dougherty et al. | 455/2 |

*Primary Examiner*—John W. Miller
*Attorney, Agent, or Firm*—Frommer Lawrence & Haug, LLP.; William S. Frommer

[57] ABSTRACT

A technique for transmitting and receiving an electronic program guide which identifies programs that are to be transmitted. Electronic program guide (EPG) data includes image data representing images of reduced, less than normal, size to identify respective programs which are to be transmitted. The EPG data is combined with program data, the latter representing different programs transmitted on different broadcast channels, and the combined data is transmitted. On reception, the EPG data is separated from the received program data and the images of reduced, less than normal size represented by the EPG data are displayed in superposition over the received program.

86 Claims, 26 Drawing Sheets

CATEGORY ICON
STATION LOGO
TITLE

TITLE BAR

DETAILED PROGRAM EXPLANATION

FIG. 13

| ITEM | (item,)descriptor(TABLE) | DATA LENGTH | REMARKS |
|---|---|---|---|
| SERVICE PROVIDER | (service_provider)Service Descriptor(SDT) | 1 byte | |
| SERVICE NAME | (service_name)Service Descriptor(SDT) | 60 byte | |
| SERVICE TYPE | (service_type)Service Descriptor(SDT) | 1 byte | |
| TITLE | (event_name)Short Event Descriptor(EIT) | | |
| SUBTITLE(TYPE) | (Component Descriptor(EIT) | | DATA UNDEFINED |
| CURRENT DATE AND TIME | UTC_time(TDT) | 5 byte. | |
| PROGRAM START TIME | start_time(EIT) | 5 byte | |
| PROGRAM DURATION (END TIME) | End_time(EIT) | 3 byte | |
| PARENTAL RATE | Parental Rating Descriptor(EIT) | 1(+3)byte | CORRESPONDING TO EACH COUNTRY NUMBER |
| PRICE | | | |
| VIDEO MODE | Component Descriptor(EIT) | 1 byte | |
| PROVIDE LANGUAGE | ISO639 language Descriptor(PMT) | 3 byte | |
| PROVIDE SOUND MODE | Component Descriptor(EIT) | 1 byte | |
| CATEGORY | Content Descriptor(EIT) | 2 byte | |
| BRIEF PROGRAM EXPLANATION | Short Event Descriptor(EIT) | 64 byte | |
| DETAILED PROGRAM EXPLANATION | Extended Event Descriptor(EIT) | 256 byte | |
| PROMOTION INFORMATION | Promotion Descriptor(SDT) | | |

ELECTRONIC PROGRAM GUIDE SYSTEM USING IMAGES OF REDUCED SIZE TO IDENTIFY RESPECTIVE PROGRAMS

BACKGROUND OF THE INVENTION

This invention relates to a technique for transmitting and receiving electronic program guide (EPG) data and, more particularly, to such a technique which permits a user to view, readily understand and select a desired one of several programs, such as television programs, that presently are being transmitted and that will be transmitted to the user's receiving apparatus.

Electronic program guides have been proposed wherein information, known as EPG data, representing different television programs that may be received by a user is transmitted over the same medium that is used to transmit the television programs themselves. For example, recently introduced satellite transmission systems, commercially available as Direct Satellite Broadcast Systems (DSS), provide a user with the ability to selectively receive one of a multiple of different broadcast channels, each of which has different television programming transmitted thereover. Typically, the user subscribes to a DSS provider and, depending upon the user's selection, different broadcast channels may be received from that provider. Some of these broadcast channels are used to transit what has become known as "premium" television programming; and depending upon subscription rates, subscription plans, and the like, a user may receive such premium television programming as well as special events, first-run movies, and the like. For example, with a single satellite dish receiver, a DSS subscriber presently may receive on the order of about 80 broadcast channels, each providing different television programming, movies, special events. etc.

EPG data systems have been proposed, wherein EPG data relating to each of the programs that may be transmitted on each of the broadcast channels for a period of time (for example, television program information for the next hour, several hours, days, weeks, etc.) are transmitted. The EPG data may be transmitted in-band (on the same broadcast channel as the program) or out-of-band (on a separate broadcast channel not normally used to carry programs). Such EPG data heretofore has been in the form of text data only, thereby providing the user with an EPG display of those television programs that are transmitted on respective broadcast channels for a given period of time. Once provided with this television program information, the user then may tune his television receiving apparatus to a desired broadcast channel at the proper time so as to receive the selected program. Often, a user may not readily appreciate the content of a particular television program simply from its displayed title. Also, a user may need more information, other than a simple title, to fully appreciate the type of television programs that are available in order to make an informed selection.

OBJECTS OF THE INVENTION

Therefore, it is an object of the present invention to provide an approved EPG technique which provides a user with adequate information relating to television programs (or other types of programs) that may be received.

Another object of this invention is to provide an improved EPG technique wherein the EPG data includes image data representing images of reduced, less than normal, size to identify respective programs which can be received.

A further object of this invention is to provide an improved EPG technique wherein the EPG data also includes text data representing information associated with each of the programs that presently are being transmitted and that will be transmitted and may be received by the user, the text data being selectively displayed as a table which provides a useful guide relating to several programs or as descriptive information relating to only a selected one of those programs.

An additional object of this invention is provide an improved EPG technique wherein EPG information is displayed as a plurality of reduced size images representing programs that presently are being transmitted and/or that will be transmitted, the reduced size images being superimposed onto a displayed program then being received.

Still another object of this invention is to provide a technique, as aforementioned, wherein receiving apparatus may be tuned quickly to a desired broadcast channel carrying a program which is identified by one of several concurrently displayed reduced size images.

Various other objects, advantages and features of the present invention will become readily apparent from the ensuing detailed description, and the novel features will particularly pointed out in the appended claims.

SUMMARY OF THE INVENTION

In accordance with this invention, an electronic program guide (EPG) which identifies programs that are to be transmitted is itself transmitted in the form of EPG data which includes image data representing images of reduced, less than normal size to identify respective programs. The EPG data is combined with current program data then being broadcasted, and the combined data is transmitted. At the receiver, the EPG data is separated from the program data and the reduced size images of the EPG data are displayed in superposition over a program on the particular broadcast channel which a user may select.

As an aspect of this invention, the EPG data includes text data representing information associated with each program that is identified by the reduced size image data. For instance, and as an illustrative numerical example, if program data transmitted over 80 different broadcast channels may be received, the EPG image and text data identify each program that is transmitted over each of the 80 channels for a given period of time (e.g., for the next hour, for the next several hours, for the next day, for the several days, etc.). In addition to displaying the images of reduced size, the user may select the text data for display. Such text data may be displayed as a table representing the programs that may be received over the different broadcast channels for the given period of time, or the text data may represent more detailed information concerning any single program that may be selected by the user.

As a feature of this invention, the reduced size images are single frame images that may be specially created to identify each program or, alternatively, that may be selected from the video frames normally constituting the respective programs.

BRIEF DESCRIPTION OF THE DRAWINGS

The following detailed description, given by way of example and not intended to limit the present invention solely thereto, will best be understood in conjunction with the accompanying drawings in which:

FIG. 13 is illustrative of the EPG data;

DETAILED DESCRIPTION OP PREFERRED EMBODIMENTS

Figure 1:
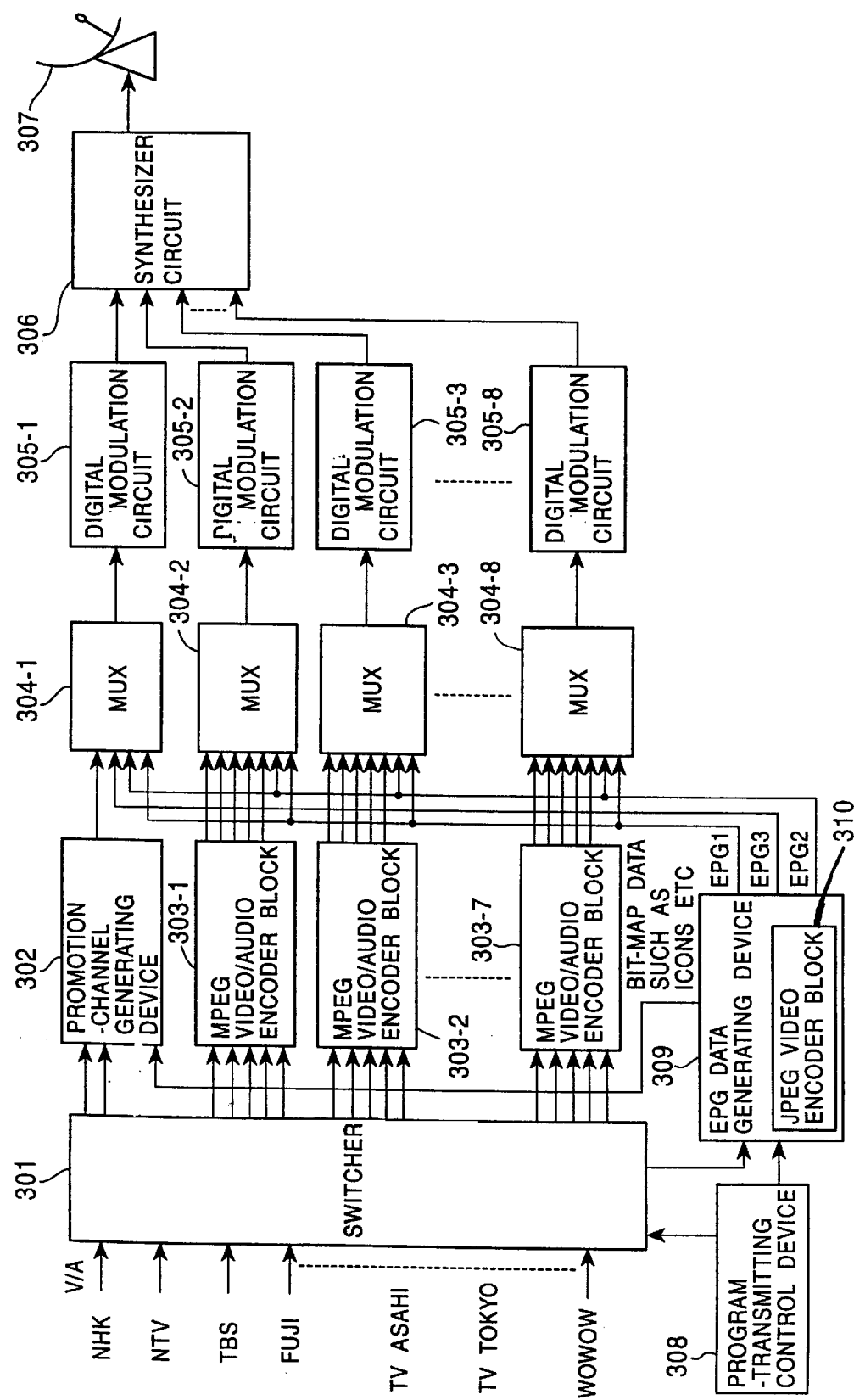
FIG. 1 is a block diagram of a transmission system which incorporates the present invention.

Referring now to the drawings, wherein like reference numerals are used throughout to identify similar elements, and in particular to FIG. 1, there is illustrated a block diagram of one embodiment of a transmission system which incorporates the present invention. In this embodiment, electronic program guide (EPG) data and program data are transmitted from, for example, a suitable ground station to a satellite from which the EPG and program data are distributed to compatible receiving devices. Although the embodiments illustrated herein are described in conjunction with satellite transmission systems, such as direct video broadcast (DVB), DSS and other satellite systems, it will be readily appreciated that the teachings of this invention are equally applicable to the transmission of program and EPG data via conventional over-the-air broadcast systems (such as VHF and UHF systems), cable television systems, and the like. For convenience, however, FIG. 1 is illustrated and described in conjunction with satellite transmission systems wherein a satellite is provided with a plurality of transponders, each of which is operable to transmit several broadcast channels of program data. For example, each transponder may be operable to transmit ten broadcast channels (e.g., PBS, NBC, HBO, etc.), but for convenience and simplification, each transponder is described herein as transmitting five broadcast channels. Also, and as will be explained, a separate transponder, described as a promotion channel transponder, is dedicated to the transmission of two or more promotion channels. Again, for convenience, while the promotion channel transponder is described as being operable to transmit only two promotion channels, it will be readily appreciated that a greater number of promotion channels may be transmitted thereby.

Digital video and audio program data (V/A) provided for transmission by each of several broadcast channels are supplied to a switcher 301. The video and audio program data are referred to as program data; and it will be appreciated that such program data constitutes a television program provided by conventional television stations, such as PBS, NBC, TBS, and the like. The television stations with which the present invention finds ready application are not limited solely to those television stations which operate in the United States; and FIG. 1 illustrates several different television stations which are located in the United States, Japan and elsewhere. It will also be appreciated that the program data provided by one of these broadcast channels need not be limited to television programming; and, alternatively, such program data may be suitable program information produced by other types of data bases. Accordingly, it will be understood that, as used herein, "program data" refers to television programming as well as such other types of program information produced by other data bases.

Switcher 301 is coupled to a program control device 308 which controls the switcher to divide the program data supplied thereto via respective broadcast channels into groups of broadcast channels. Each such broadcast channel carries the aforementioned program data which currently is being transmitted. Assuming that the program data transmitted on a respective broadcast channel contains video and audio data, each group of five broadcast channels is coupled to a respective MPEG encoder 303-1, 303-2, . . . 303-7 wherein the video and audio data are compressed in accordance with the known MPEG standard. Program control device 308 also controls switcher 301 to couple two broadcast channels to a promotion channel generator 302 which is described in greater detail in connection with FIG. 2. Suffice it to say that the promotion channel generator operates to produce promotion program data which, as will be described, differs from the broadcast channel program data primarily in that the promotion channel program data consists of single frame video data used to promote particular broadcast channels which carry television program data that may be of special interest. The promotion channel program data may be thought of as special advertising data that may be prepared by special sponsors; and the transmission of such promotion program data over the selected promotion channels is a service purchased by such sponsors.

EPG data is generated by an EPG data generator 309 and is formed of image data representing viewable images of reduced size (EPG 1) and text data (EPG 2 and EPG 3, to be described). In one embodiment, the EPG image data is separately generated and stored (not shown) as a single frame of video data representing an image that is typical of a respective program. For example, if the transmission system shown in FIG. 1 is operable to transmit 80 broadcast channels of program data and if each broadcast channel operates, on the average, to broadcast 30 different programs in a 24 hour period, 30×80=2400 frames of reduced size images are stored as the EPG image data (EPG 1) for each 24 hour period. In the preferred embodiment, however, switcher 301 supplies to EPG data generator 309 a selected frame contained in each program supplied to the switcher over the respective broadcast channels. The EPG generator includes a Joint Photographic Experts Group (JPEG) encoder 310 which is supplied with the respective video frames selected by switcher 301 to encode those frames in accordance with the JPEG standard thereby producing the EPG image data (EPG 1).

As will described below, the promotion program data that is received and displayed on television receiving apparatus includes icons which represent different categories of programs (e.g., movie, drama, comedy, sport, etc.), logos adopted by the different broadcast channels and other graphic displays. The transmission of such icons, logos and graphic displays may occupy a large amount of the data capacity of the promotion program data. It is preferable, then, to pre-store at each receiver (as by conventional sending and storing techniques) the aforementioned, icons, logos and graphic displays and then transmit, as part of the promotion program data, access information which is used at the receiver to read out and display the pre-stored icons, logos and graphic displays. Such access data may be, for example, bit-map data; and as illustrated in FIG. 1, such access data is generated by EPG data generator 309 and supplied to promotion channel generator 302 whereat it is combined with the program data of the two broadcast channels selected as promotion channels by switcher 301.

Each MPEG encoder 303-1 . . . 303-7 compresses the video and audio data included in the program data supplied thereto by the respective group of five broadcast channels. The compressed program data produced by MPEG encoder 303-1 is coupled to a multiplexer 304-2; the compressed program data produced by MPEG encoder 303-2 is coupled to a multiplexer 304-3, and so on, whereby the compressed program data produced by MPEG encoder 303-7 is coupled to a multiplexer 304-8. It is seen, then, that each multiplexer 304-2 . . . 304-8 is supplied with five broadcast channels of compressed program data. An additional multiplexer 304-1 is coupled to promotion channel generator 302 to receive the promotion program data derived from the two broadcast channels selected by switcher 301 as well as the bit-map data generated by EPG data generator 309, as will be described in greater detail in connection with FIG. 2.

Figure 11A:
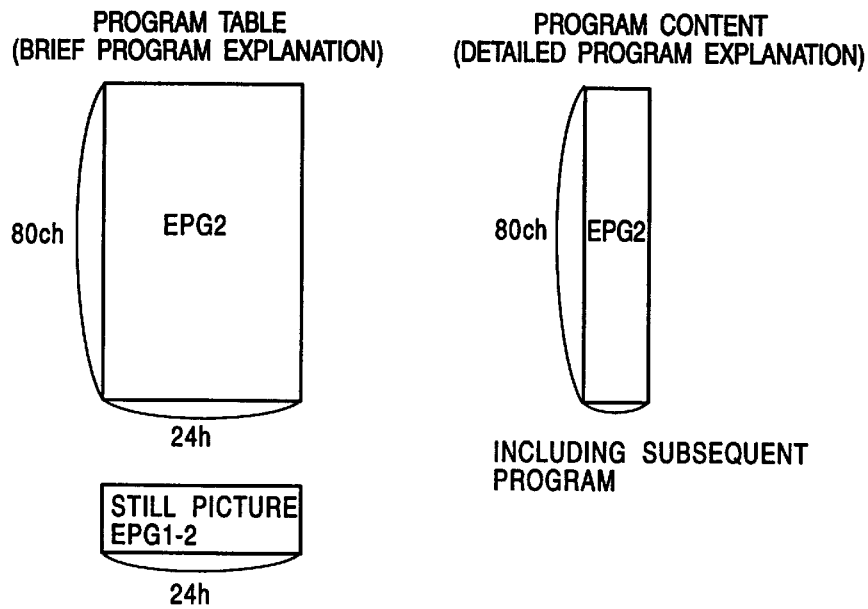
FIGS. 11A and 11B schematically illustrate the program table data and the program content data which are transmitted by normal broadcast channel transponders and by promotional channel transponders, respectively.
Figure 11B:
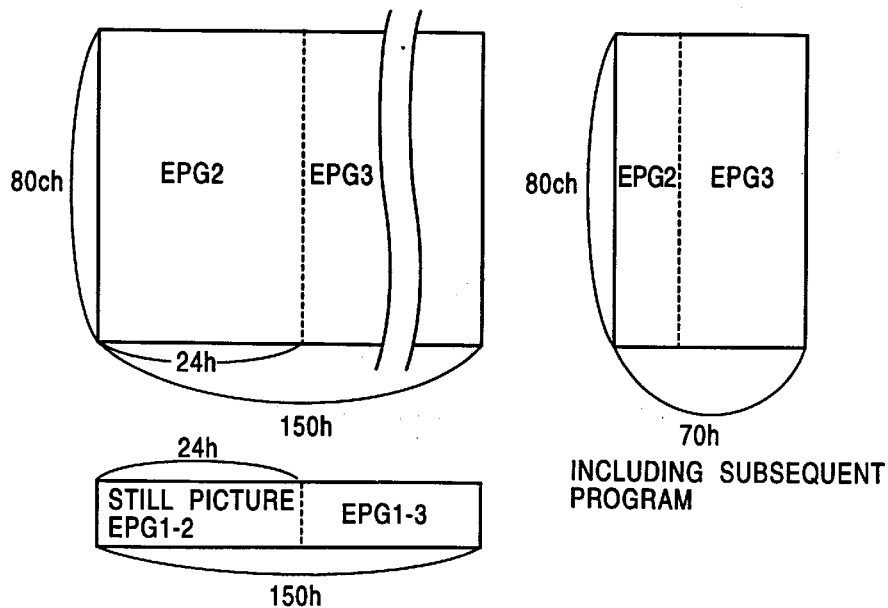

EPG image data (EPG 1) is supplied from EPG data generator 309 to each of multiplexers 304-1 . . . 304-8 and EPG text data (EPG 2) also is supplied from the EPG data generator to each of these multiplexers. The EPG image data (EPG 1) is comprised a single frame of video data, processed to be of reduced size, and is referred to herein as still picture data; and the EPG text data (EPG 2) is referred to herein as program guide text data. The program guide text data (EPG 2) is associated with, for example, 80 broadcast channels and includes information, such as channel identification, program title, broadcast time and date and other descriptive material, relating to the program which is to be transmitted. This program guide text data (EPG 2) is associated with programs to be transmitted over a predetermined time duration, such as programs that currently are being transmitted as well as programs that will be transmitted over the next 24 hours. EPG data generator 309 is operable to generate additional program guide text data (EPG 3) which is similar to EPG 2 but relates to programs that will be transmitted for an additional period of time, for example, programs that will be transmitted for an additional 126 hours. FIGS. 11A and 11B, which will be described below, schematically illustrate the relationship between the program guide text data EPG 2 and EPG 3. In the preferred embodiment described herein, program guide text data (EPG 3) is supplied to multiplexer 304-1 for transmission with the promotion program data. As mentioned above, the promotion program data may be thought of as being transmitted over the promotion channel and serves the function of promoting particular programs transmitted on one or more of the broadcast channels.

Each of multiplexers 304-1 . . . 304-8 operates to multiplex the EPG and program data supplied thereto to produce a data output channel. The respective data output channel, comprised of multiplexed EPG1, EPG2 and compressed program data (the data output channel from multiplexer 304-1 also includes EPG 3) is coupled to a digital modulator 305-1 . . . 305-8 which performs digital modulation on the multiplexed EPG and program data produced by each of the respective multiplexers. For example, each digital modulator may perform quadraphase shift keying (QPSK), EFM, or other conventional digital modulation. The resulting digital modulated data output channels produced by the digital modulators are transmitted to respective transponders located on a satellite by means of a synthesizer 306 and a ground-to-satellite antenna 307. In the embodiment shown in FIG. 1, the digital modulators and synthesizer transmit the data output channels from multiplexers 304-1 . . . 304-8 respectively, to a corresponding one of 8 transponders. The transponders to which the modulated data output channels from multiplexers 304-2 . . . 304-8 are supplied are referred to as normal broadcast transponders 2, 3, . . . 8 and the transponder to which the modulated data output channel from multiplexer 304-1 is supplied is referred to as the promotion channel transponder, also known as the "guide" transponder. These transponders are used to transmit the promotion channels and the broadcast channels to receiving devices that are furnished with compatible satellite dish antennas.

It is seen, then, that if the EPG data represents programs broadcasted on 80 broadcast channels, each of the data output channels from multiplexers 304-1, . . . 304-8 contains the same EPG data. As mentioned above, in the embodiment described herein, the data output channel from multiplexer 304-1 contains additional EPG data namely EPG 3.

Figure 2:
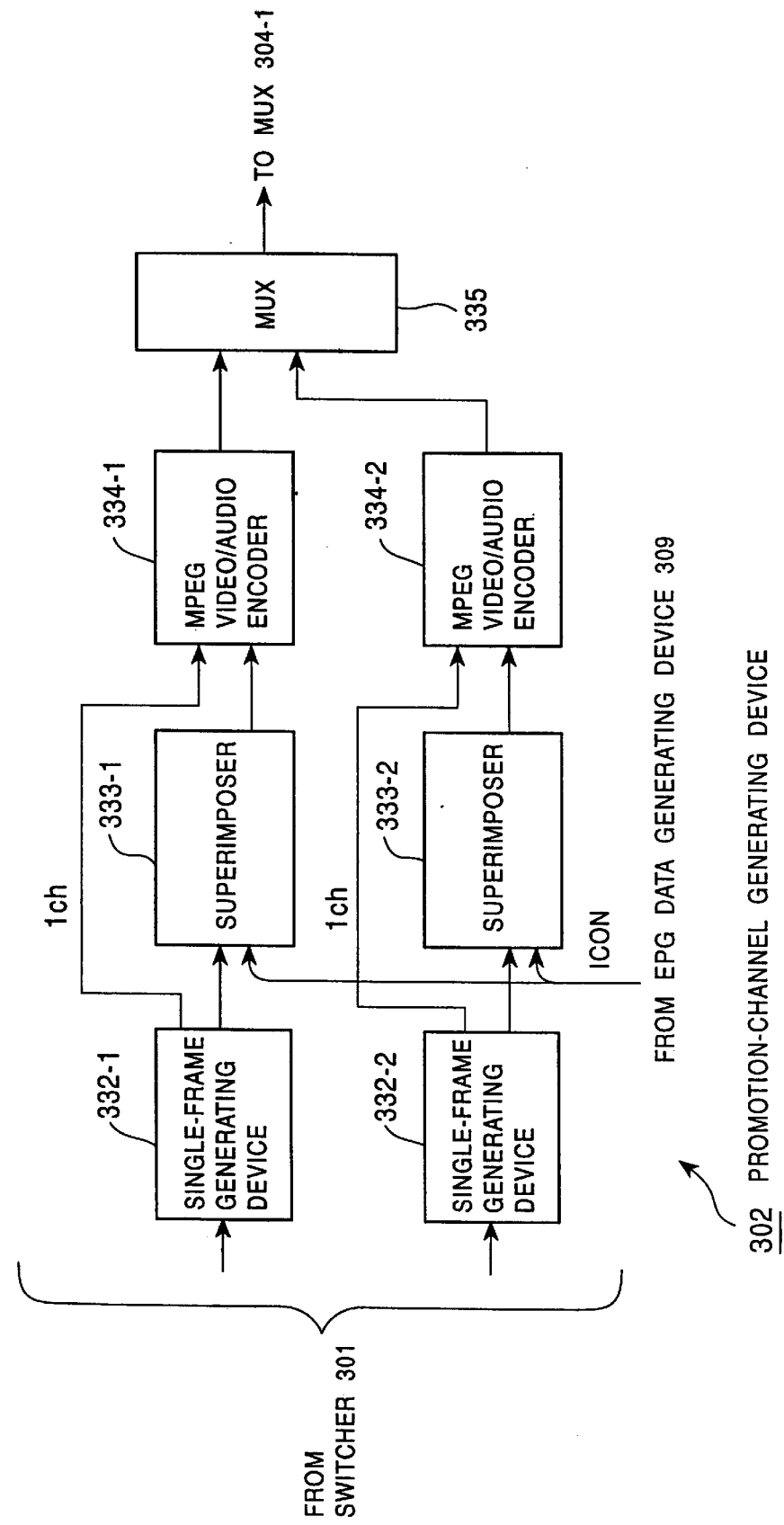
FIG. 2 is a block diagram of a portion of the apparatus shown in FIG. 1.

Promotion channel generator 302 is illustrated in greater detail in FIG. 2. Two single frame generators 332-1 and 332-2 are coupled to switcher 301 to receive therefrom the video and audio data transmitted over the two broadcast channels selected as the promotion channels by the switcher. As an example, the promotion channels need not necessarily be network television channels normally used to broadcast network television programming. Rather, the promotion channels may be separate, dedicated channels made available to sponsors such as other commercial television networks for the purpose of broadcasting to consumers information relating to sponsored programs. Each of the single frame generators processes the video data supplied on the broadcast channel selected as the promotion channel to generate single video frames. For example, the same video frame may be transmitted for a given time interval, such as for a second, for a minute or for several minutes.

The output from single frame generator 332-1 is referred to as single-frame data and is supplied to a superimposer 333-1. The audio data associated with the broadcast channel that has been selected by switcher 301 as the promotion channel is coupled from single frame generator 332-1 to an encoder 334-1 which, as illustrated in FIG. 2, is identified as an MPEG video/audio encoder. In a similar manner, the single-frame data produced by single frame generator 332-2 is supplied to a superimposer 333-2; and the audio data contained in the broadcast channel which has been selected by switcher 301 as the promotion channel is coupled from single frame generator 332-2 to an MPEG video/audio encoder 334-2. Superimposers 333-1 and 333-2 also are supplied with the aforementioned access data generated by EPG data generator 309 and referred to heretofore as bit-map data. This access data is combined with the single-frame data by the superimposer; and the combined data is coupled to a respective one of the MPEG video/audio encoders.

Each MPEG video/audio encoder operates to compress the single-frame video data, the superimposed access data and the audio data supplied thereto. The resultant compressed promotion channel program data from encoders 334-1 and 334-2 are multiplexed together by a multiplexer 335 and supplied as promotion channel program data to multiplexer 304-1 of FIG. 1.

Figure 3:
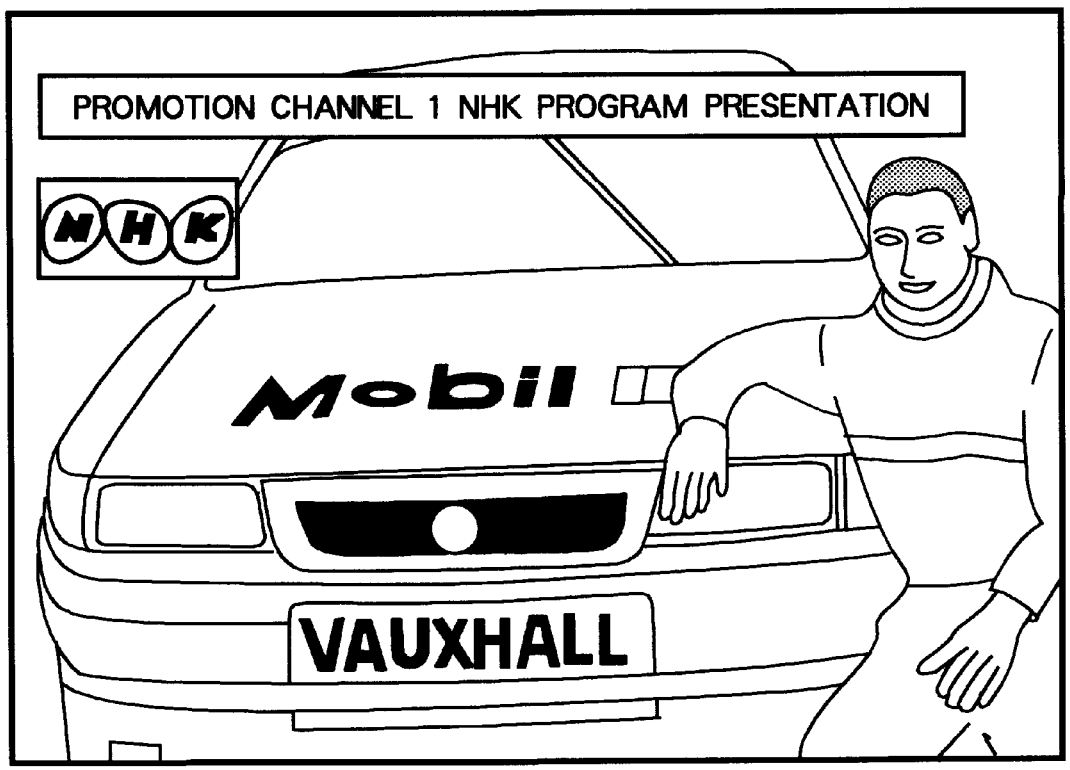
FIG. 3 illustrates a promotion channel display derived from the promotion channel transmitted by the apparatus shown in FIG. 1.

A display of the promotion program data processed by single frame generator 332-1, superimposer 333-1 and MPEG video/audio encoder 334-1 is illustrated in FIG. 3. It will be seen that text data produced by EPG data generator 309, as well as a logo display, are superimposed onto the single frame of video data produced by single frame generator 332-1. Here, the text data reads: "promotion channel", "NHK channel 1", "program presentation". Thus, the text data provides the promotional information which, in this instance is sponsored by the NHK television broadcast network of Japan. It will be understood that the single frame video display is itself an advertisement which may be paid for by a sponsor.

The NHK logo shown in FIG. 3 may, in one embodiment be generated by EPG data generator 309 (FIG. 1) or may be stored at the receiving device (to be described) and accessed from storage by the transmission of suitable access data (such as bit-map data) generated by the EPG data generator and transmitted over the promotion broadcast channel.

Figure 4:
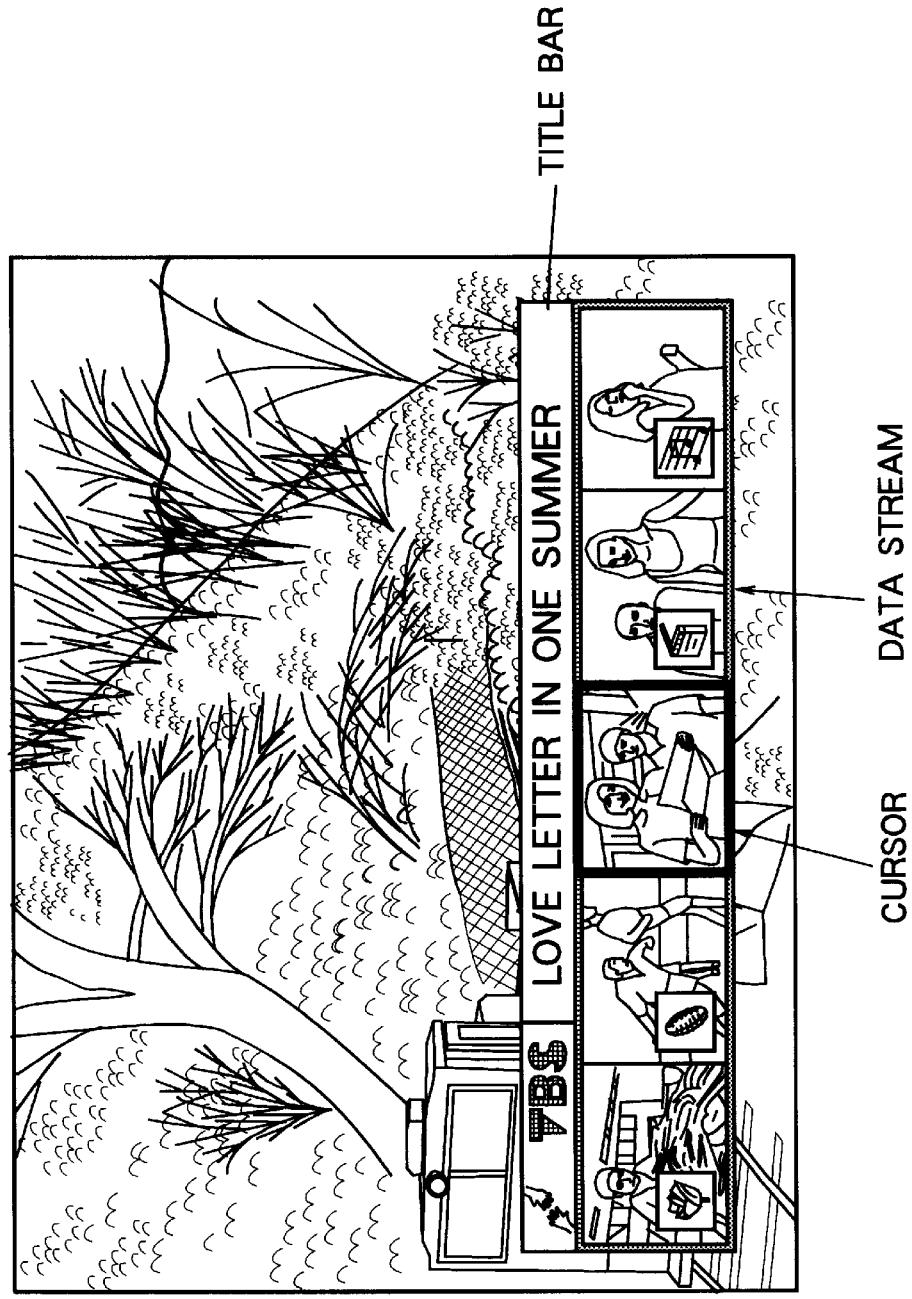
FIG. 4 illustrates the EPG display produced by the present invention.

To best appreciate the electronic program guide which is transmitted, received and displayed in accordance with the present invention, reference is made to FIGS. 4–10 which illustrate the respective displays that are selectively produced from the EPG data transmitted by the apparatus shown in FIG. 1. As will be described, it is preferred that the transmitted EPG data not be displayed automatically. Rather, such EPG data is stored at the receiver (FIG. 23) and selectively retrieved from storage by the user's operation of a suitable remote control device of the type shown in FIG. 24. Hence, when the EPG display is not selected, the receiving apparatus, and more particularly the television monitor displays whatever program currently is being transmitted over the broadcast channel and that has been selected by the user. When the user wishes to exploit the EPG data that has been transmitted to and stored at his receiver, he selects an EPG display mode (as will be described), resulting in the display of several images of reduced, less than normal size, superimposed over the program which then is being received over the broadcast channel to which the receiver is tuned. FIG. 4 illustrates the superposition of, for example, five reduced size images, also referred to as still picture images or EPG images, displayed in what is referred to as a program window, superimposed over the "normal size" display of the program which then is being received. Each still picture image is reproduced from image data EPG 1 produced by EPG data generator 309, as aforedescribed. For ease of understanding a category icon is superimposed on each respective still picture image, thereby enabling the user to identify quickly the type of program that is identified by that still picture image. These category icons may be generated by EPG data generator 309 and included as the still picture data EPG 1 or, alternatively, the category icons may be stored at the user's receiver and accessed therefrom by suitable access data, such as bit-map data, included with the still picture data EPG 1 generated by the EPG data generator.

As mentioned above, in the preferred embodiment of the present invention, the EPG image data EPG 1 represents all of the programs which currently are being transmitted on the broadcast channels (for example, all of the programs currently being transmitted on the 80 broadcast channels) and may also represent those programs which will be transmitted over a given period of time (for example, over the next 1, 4 or 24 hours) on the broadcast channels. Such EPG image data is stored at the receiver and selectively retrieved and displayed by the user in response to his operation of the remote control device. Thus, the user may display and scroll through various still pictures, thereby discerning those programs which he may wish to view. A cursor is displayed adjacent or, alternatively, superimposed over the still pictures, this cursor being positionable at or over a desired still picture, as selected by the user, for the purpose of displaying EPG text data associated with the program identified by that still picture or, in accordance with one embodiment, to tune the user's receiver to the broadcast channel over which the program identified by that still picture is transmitted.

In addition to the program window superimposed over the program display, as shown in FIG. 4, the EPG display mode preferably displays information in a "title bar" that also is superimposed on the program display. In one embodiment, the title bar displays text data that is associated with the displayed program, such as the broadcast channel over which the program is transmitted, the title of that program and, optionally, an icon representing the category of that program. As the user tunes his receiver to a different broadcast channel, the information displayed in the title bar changes in a similar manner to display the broadcast channel, title of the program and category of that program to which the receiver now is tuned. It will be appreciated that the information displayed in the title bar is included in the program data supplied to and encoded by the MPEG encoders 303-1 . . . 303-7 of FIG. 1.

Alternatively, the information displayed in the title bar shown in FIG. 4 may be associated with the program identified by the still picture that has been selected by the cursor. That is, depending upon the particular still picture to which the user places the cursor, the title bar displays the title of the program identified by that still picture, the broadcast channel over which that program is transmitted and the category of that program.

Figure 5:
FIG. 5 illustrates the title bar shown in FIG. 4.
Figure 6:
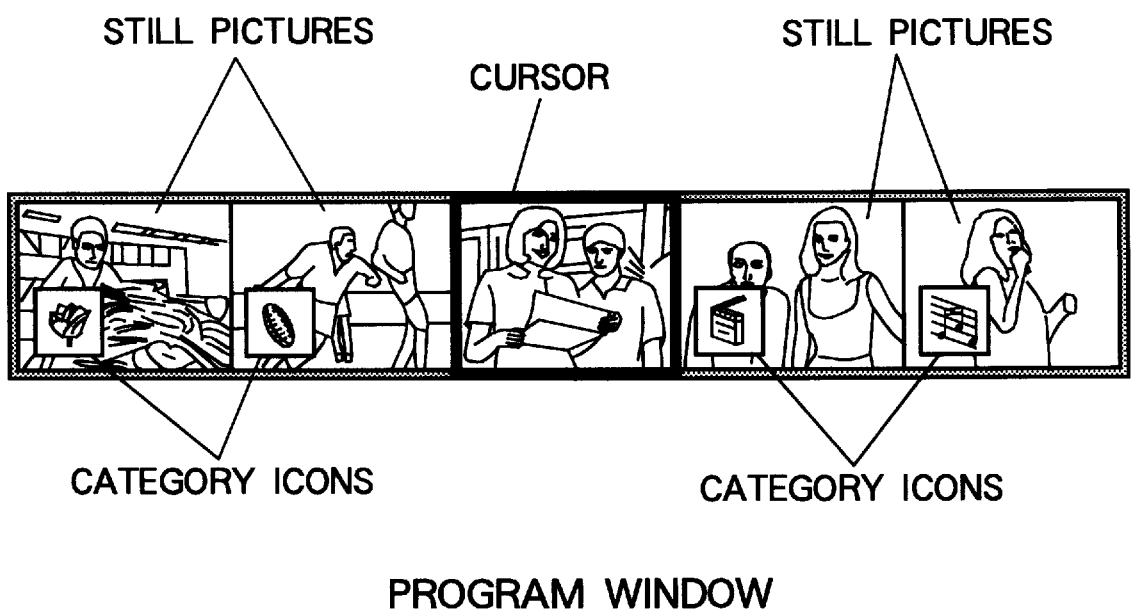
FIG. 6 illustrates the reduced size images which are displayed as EPG data in accordance with the present invention.

FIG. 5 illustrates the title bar shown in FIG. 4 and FIG. 6 illustrates the program window which contains the EPG images also shown in FIG. 4.

Figure 7:
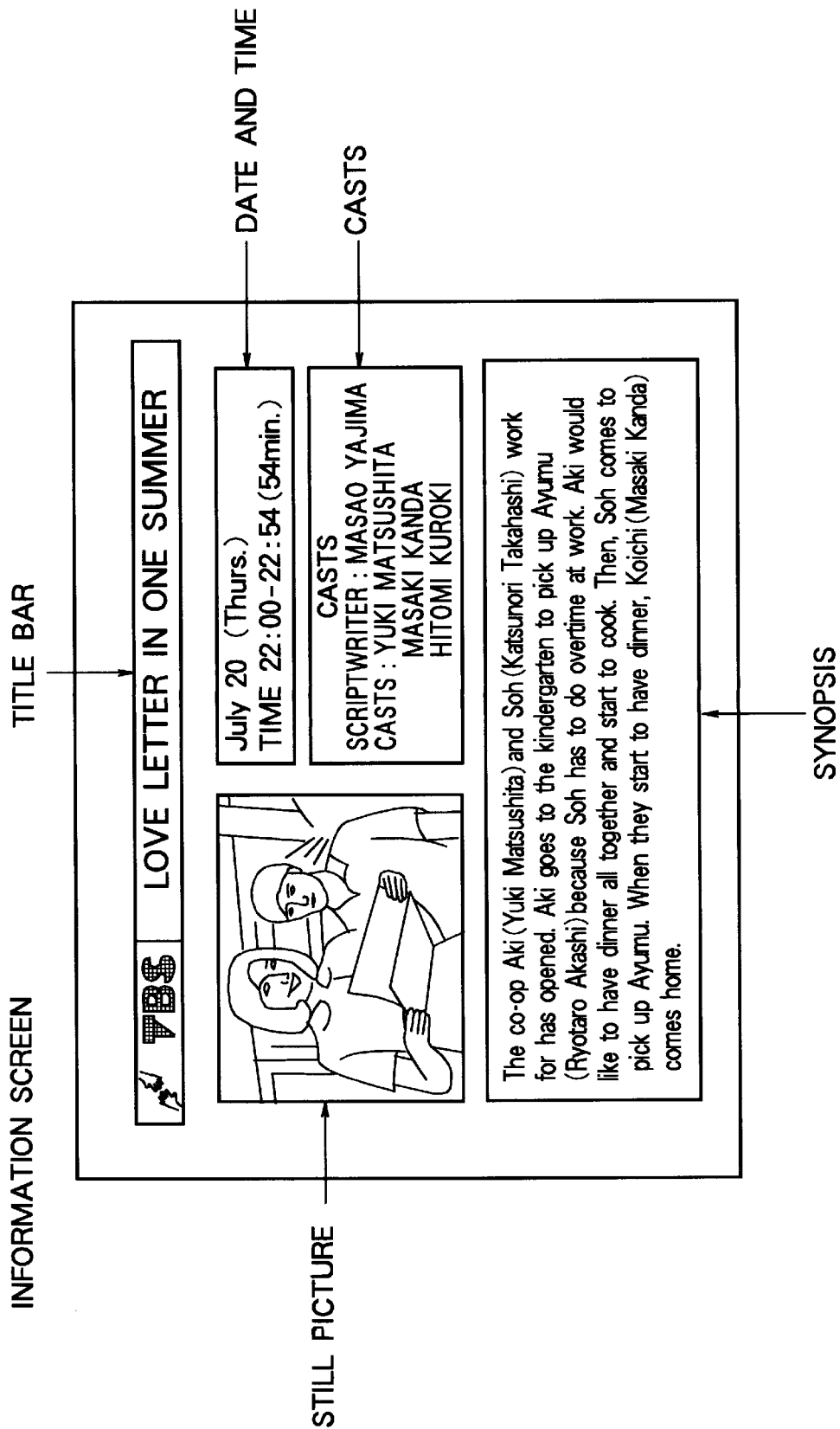
FIG. 7 illustrates EPG image and text display.

The EPG text data associated with the program identified by a selected still picture may be selectively displayed by appropriate user-operation of the remote control device. As mentioned above, the EPG image data as well as the EPG text data are stored at the receiver. It is expected the user will position the cursor on or adjacent a desired still picture and then operate a suitable selector button on his remote control device to retrieve and display the EPG text data as shown in FIG. 7. Preferably, this display constitutes a full screen display, although the information shown in FIG. 7 may be displayed in a suitable "window" on the display screen. It is seen that the display includes the still picture image represented by EPG image data EPG 1 as well as text data represented by EPG text data EPG 2. In the example shown in FIG. 7, this EPG text data includes the date and time of broadcast of the program identified by the still picture, the broadcast channel over which this program is transmitted, the cast and also a synopsis of that program. The cast and synopsis may be thought of as detailed program information referred to as program content data. The title, date and time of the program to be transmitted are referred to as brief program information and are included in program table data to be described. FIG. 7 also illustrates the title bar discussed above in conjunction with FIGS. 4 and 5.

Figure 8:
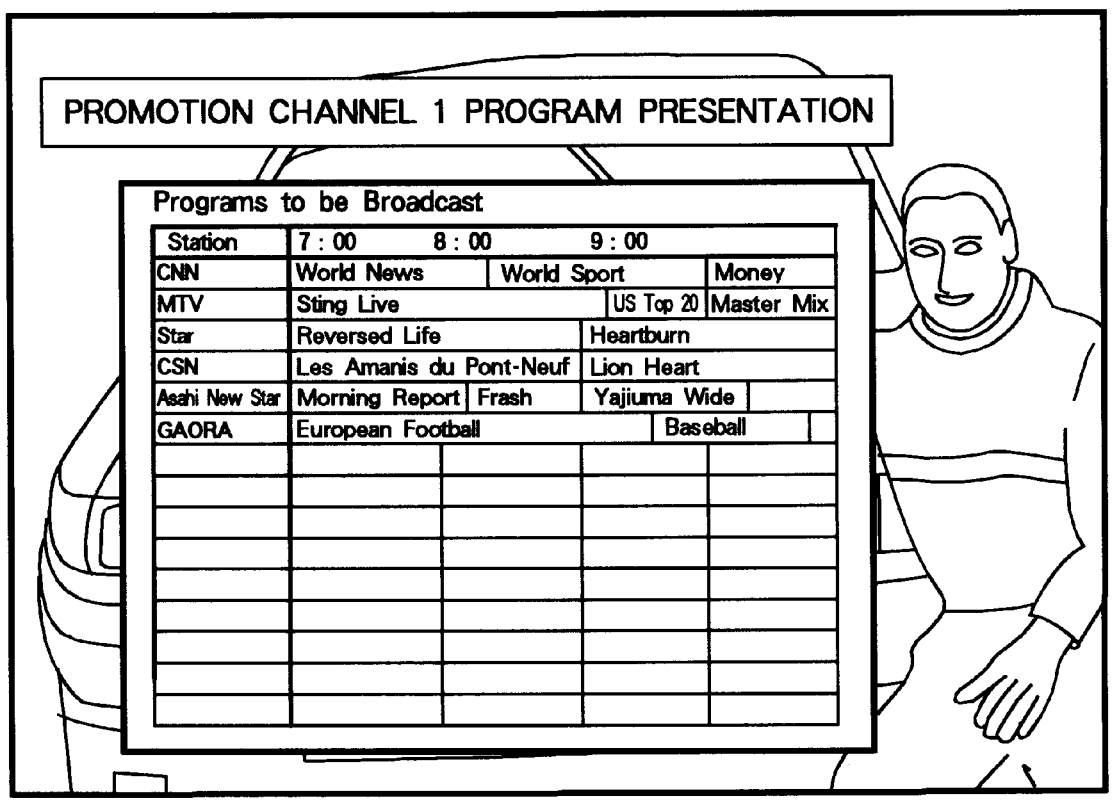
FIG. 8 illustrates a portion of the program table display derived from the EPG data transmitted by the present invention.
Figure 9:
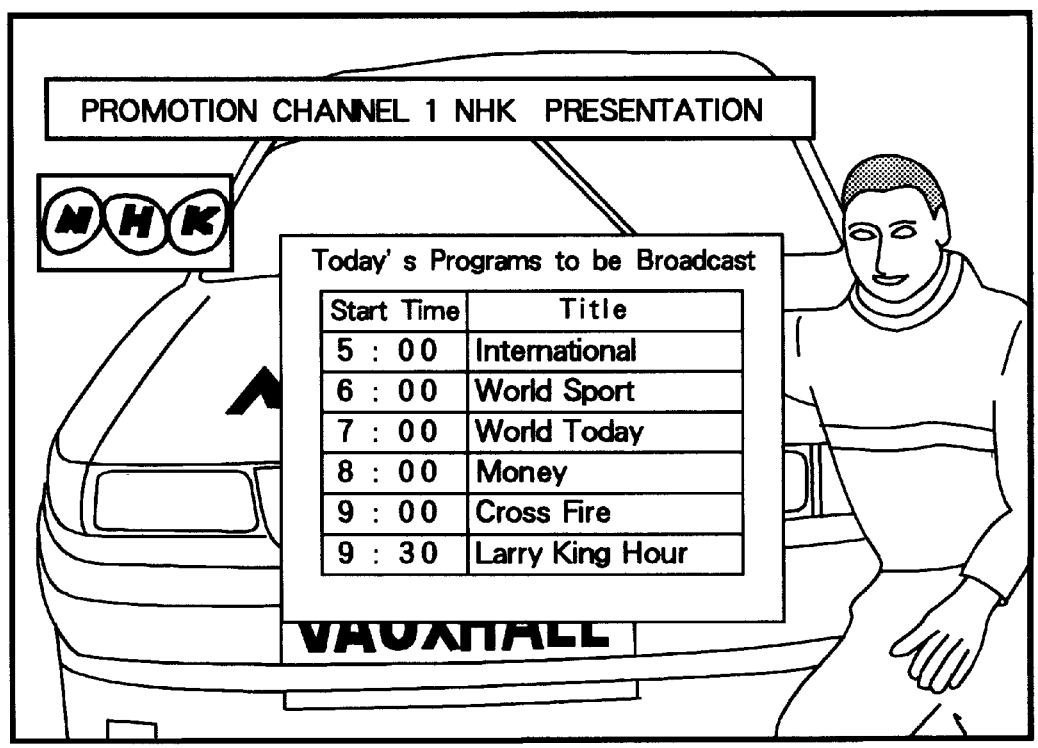
FIG. 9 illustrates a program table display for one broadcast channel.
Figure 10:
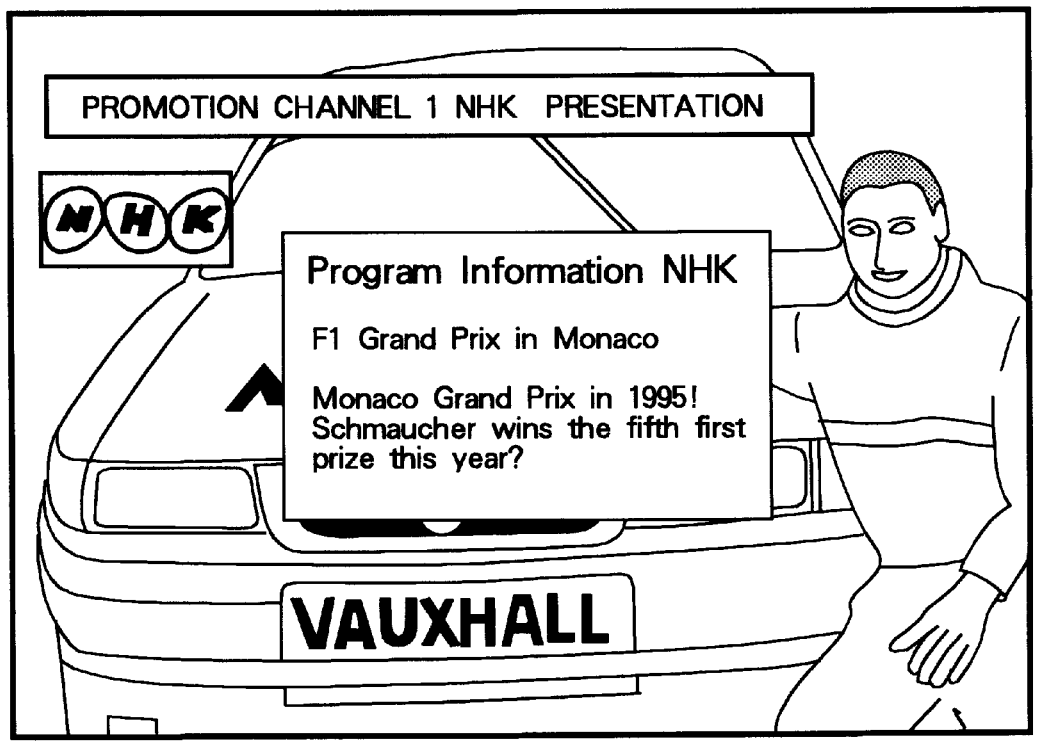
FIG. 10 illustrates a program content display derived from the EPG data which is transmitted in accordance the present invention.

The EPG text data EPG 2 and EPG 3 normally are stored at the user's receiver and, depending upon the display mode selected by the user, such EPG text data may be displayed in the form of a table to display the programs that will be transmitted over the broadcast channels for a given time period, such as shown in FIG. 8, or may be displayed as a program table representing the programs that will be transmitted over a particular broadcast channel, such as shown in FIG. 9, or as a detailed program display associated with a particular program selected by the user, such as shown in FIG. 10. In each of these figures, the EPG text date is superimposed over the aforedescribed promotion channel display. Nevertheless, it will be appreciated that the EPG text data shown in FIGS. 8, 9 and 10 may be superimposed over a program then being received by one of the other broadcast channels, or the display may be a full screen display with no background images.

The program table shown in FIG. 8 displays the titles of those programs which are transmitted by respective broadcast channels for particular periods of time. It is expected that the displayed table will list less than all of the eighty broadcast channels (which has been used as the illustrative example), and the user may scroll through additional, similar display screens to display the television programs to be transmitted over the additional broadcast channels. Likewise, the program table display of FIG. 8 depicts those programs which are transmitted over a three hour duration; and since the EPG text data includes EPG data associated with many more hours of programming, the user may scroll through additional display screens to display those programs which will be transmitted at later times.

The program table display of FIG. 9 is similar to that of FIG. 8, except that the FIG. 9 display is limited to those programs which are transmitted over a particular single broadcast channel. The table of FIG. 9 may illustrate those programs which are to be transmitted over, for example, a five hour duration; and the user may scroll through additional display screens in order to display the additional programs to be transmitted at later times over this broadcast channel. Whereas FIGS. 8 and 9 depict program tables which display what may be thought of as brief program information (e.g. time of transmission, program title and broadcast channel), FIG. 10 illustrates a display of more detailed information, referred to herein as program content data. This information is included in the EPG text data EPG 2 (and EPG 3) produced by EPG data generator 309 of FIG. 1; and preferably is updated periodically, such as every 15 minutes. This detailed program information includes, for example, a description or synopsis of a particular program, its cast, its date of production, and other information that may be of use to the user. Such information may be retrieved from the EPG text data stored at the receiver by suitable operation of the remote control device. For example, the cursor may be used to select a particular still picture that is displayed, and then an information button on the remote control device may be operated to read out the display shown in FIG. 10 which is associated with the program identified by that still picture. Alternatively, a cursor may be used to select a particular program that is displayed in the program table of FIG. 8 or the program table of FIG. 9, thereby retrieving the text data shown in FIG. 10 which is associated with the selected program.

It will be recognized that the EPG text data needed to display the program table shown in FIG. 8 or FIG. 9, the detailed program information shown in FIG. 10 and the information screen shown in FIG. 7 occupies much of the available transmission capacity of the data output channels produced by multiplexers 304-1 . . . 304-8 of FIG. 1. If each data output channel includes all of the EPG data needed to transmit the still EPG images and all of the EPG text data, the remaining data capacity of these data output channels may not be sufficient for adequate transmission of the video and audio data. To obviate this disadvantage, it is preferred to transmit a lesser amount of EPG data with the "normal" broadcast channels than with the promotion broadcast channels. That is, and with reference to FIG. 1, it is preferred to transmit a lesser amount of EPG data on the data output channels of multiplexers 304-2 . . . 304-8 than on the data output channel from the multiplexer 304-1. This is attained by supplying EPG data EPG 1 and EPG 2 to multiplexers 304-2 . . . 304-8 and to supply EPG data EPG 1, EPG 2 and EPG 3 to multiplexers 304-1. The difference between the EPG data represented by EPG 2 and EPG 3 is schematically represented in FIGS. 11A and 11B.

FIG. 11A schematically illustrates the EPG data that is supplied to and transmitted by the "normal" transponders, namely those transponders which are used to transmit the normal broadcast channels received on the data output channels from multiplexers 304-2 . . . 304-8. FIG. 11B schematically represents the EPG data that is supplied to and transmitted by the transponder assigned to transmit the promotion broadcast channels, this transponder being referred to hereinabove as the "guide" transponder, and received on the data output channel from multiplexer 304-1. The EPG text data EPG 2 supplied to a normal transponder includes program table data (referred to as "brief program information") and program content data (referred to as "detailed program information"). It is assumed that the program table and program content data are associated with programs that are transmitted over, for example, 80 broadcast channels. Since the amount of data needed to represent the program table for a given channel is less than the amount of data needed to represent the program content for that channel, the program table data may represent program information for the 80 channels which are transmitted over a greater period of time and the program content data may represent program information for the 80 channels which are transmitted over and shorter period of time. For example, the program table data EPG 2 of the type shown in FIG. 8 may represent the programs transmitted over the 80 broadcast channels for a twenty-four (24) hour period, whereas the program content data EPG 2, shown in FIG. 10, may represent the programs transmitted over these 80 channels for a shorter period of time, such as four (4) hours. In one embodiment, the EPG image data EPG 1 represents the programs that will be transmitted over these 80 channels for the next one hour period; and in another embodiment, the EPG image data represents the programs that will be transmitted over, for example, a 24 hour period.

A greater amount of EPG data is transmitted by the guide transponder, as depicted in FIG. 11B. Although the guide transponder may transmit normal programming in addition to promotion programs, the amount of normal programming transmitted by the guide transponder is less than that transmitted by the normal transponder, thus increasing the available data capacity for transmission of the EPG data. Thus, the guide transponder may transmit program table data EPG 2 for 80 broadcast channels over a 24 hour period, and the guide transponder also may transmit program table data EPG 3 representing the programs transmitted by those 80 broadcast channels over the succeeding 126 hours. The guide transponder thus may transmit still picture data EPG 1, program table data EPG 2 and program table data EPG 3 representing the programs transmitted over 80 broadcast channels for a 150 hour period. It is appreciated that this large quantity of EPG data may be used by the consumer to properly plan and select programs for viewing over a relatively long term (for example, over a 5-day period).

FIG. 11B also illustrates the program content data (for example, the data which is displayed in FIG. 10) that may be transmitted by the guide transponder for 80 broadcast channels. In the example illustrated, the guide transponder transmits program content data EPG 2 associated with the programs transmitted by 80 broadcast channels over the next 4 hours; and the guide transponder also transmits the program content data EPG 3 associated with the programs transmitted over these broadcast channels for the next-following 66 hours. It will be seen, then, that by receiving the EPG data from the normal and guide transponders, a sufficient quantity of EPG data may be stored at the receiver to permit the user to display EPG still pictures, brief program information as well as detailed program information relating to those programs currently being transmitted and those programs which will be transmitted over the next few days. It also will be recognized that the program content data is associated with those programs that will be transmitted during a fraction of the time interval that is represented by the program table data. Whereas the program table data transmitted by the normal transponder is associated with programs that will be transmitted over a 24 hour period, the program content data transmitted by the normal transponder is associated with programs that will be transmitted over only a 4 hour period. Likewise, whereas the program table data that is transmitted by the guide transponder relates to programs that will be transmitted over a 150 hour period, the program content data that is transmitted by the guide transponder is associated with programs that will be transmitted over a 70 hour period.

Figure 12:
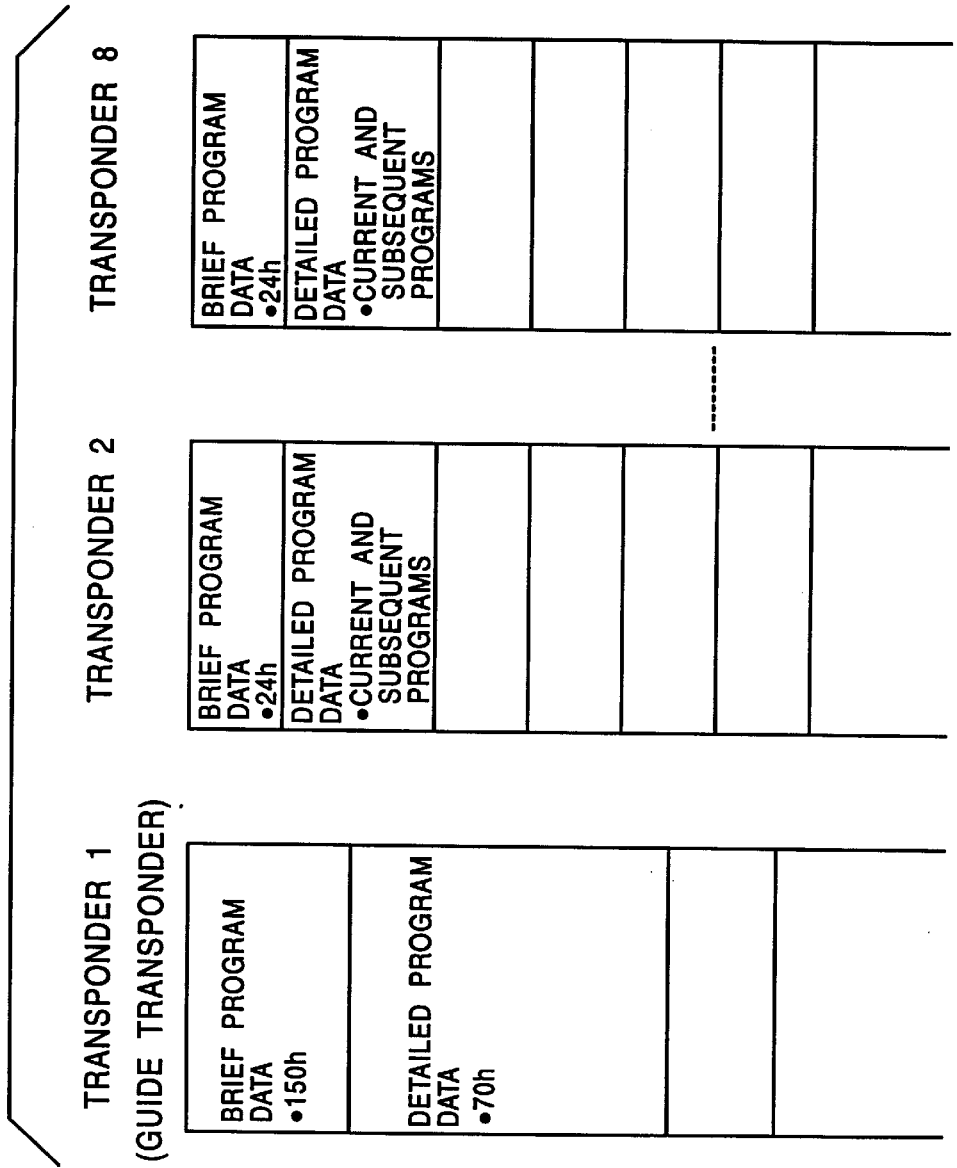
FIG. 12 schematically illustrates the EPG data transmitted by the normal broadcast channel transponders and the promotional channel transponder.

FIG. 12 schematically represents the EPG data that is transmitted by the guide transponder, identified as transponder 1, and the normal transponders, identified as transponder 2 . . . transponder 8. The guide transponder is supplied with and transmits program table data associated with programs transmitted over a 150 hour period and with program content data associated with those same programs, but transmitted over a 70 hour period. The guide transponder also is supplied with the EPG still image data and also with the program data of the promotion broadcast channels, namely the single frame data discussed above in conjunction with FIGS. 1 and 2. Each of the normal transponders is supplied with program table data associated with programs that will be transmitted over a 24 hour period and with program content data associated with those same programs but transmitted over a 4 hour period. Each normal transponder also is supplied with the EPG image data and with the program data transmitted over several broadcast channels. In the example discussed in conjunction with FIG. 1, it has been assumed that each of the normal transponders operates to transmit 5 broadcast channels; but in a practical embodiment, it is expected that each normal transponder is operable to transmit up to 10 or more broadcast channels. Likewise, in a practical implementation, the guide transponder need not be limited solely to the transmission of promotion programs (together with, of course, EPG data), but may be used to transmit regular broadcast channels as well, such as 2 promotion channels and 8 broadcast channels. It will be recognized that the present invention should not be limited solely to the examples described above; and this invention is readily applicable with any practical number of broadcast and promotion channels.

Although forming no part of the present invention per se, one construction of the EPG data that may be produced by EPG data generator 309 now will be described.

The EPG data, as well as other types of accessory data, is transmitted in a Direct Video Broadcast (DVB) System as service information (SI). The data used to produce and display an electronic program table is shown in FIG. 13. A Service Description Table (SDT) includes service provider data which identifies the provider of the transmission service (e.g. the broadcast channel), the service name and the service type. For example, the service type may indicate whether the type of service is single frame service (promotion_service). The title of a program to be transmitted is defined as the event_name in the Short Event Descriptor of an Event Information Table (EIT) and may include up to 60 bytes. The subtitle (type) is represented as the Component Descriptor of the EIT. The current date and time is defined as UTC_time in the Time and Date Table (TDT), whereas the program start time is represented as start_time of the EIT and the program duration is established by the end_time of the EIT. A rating code representative of, for example, violence, profanity and nudity of the program, is included in the Parental Rating Descriptor of the EIT. The video mode is represented as a Component Descriptor of the EIT. The provide language (e.g. the language in which the program is provided) is represented in the ISO639 Language Descriptor of a Program Map Table (PMT). The sound mode is represented in the Component Descriptor of the EIT. The category of the program is set out in the Content Descriptor of the EIT.

The brief explanation of the program, such as the cast (see FIG. 7), the overall program data (see the program table of FIG. 8) and the channel program table (see FIG. 9) are represented as the 64-byte data referred to as the Short Event Descriptor of the EIT. The detailed program explanation, such as the synopsis (or content explanation) shown in FIG. 7 and the detailed program explanation shown in FIG. 10 are represented as the 256-byte data referred to as the Extended Event Descriptor of the EIT. Promotion information, such as the information shown in FIG. 3, including the item name ("Promotion Channel 1, NHK"), the item content ("Program Introduction"), and the station logo, are represented as the Promotion Descriptor of the SDT.

Figure 14:
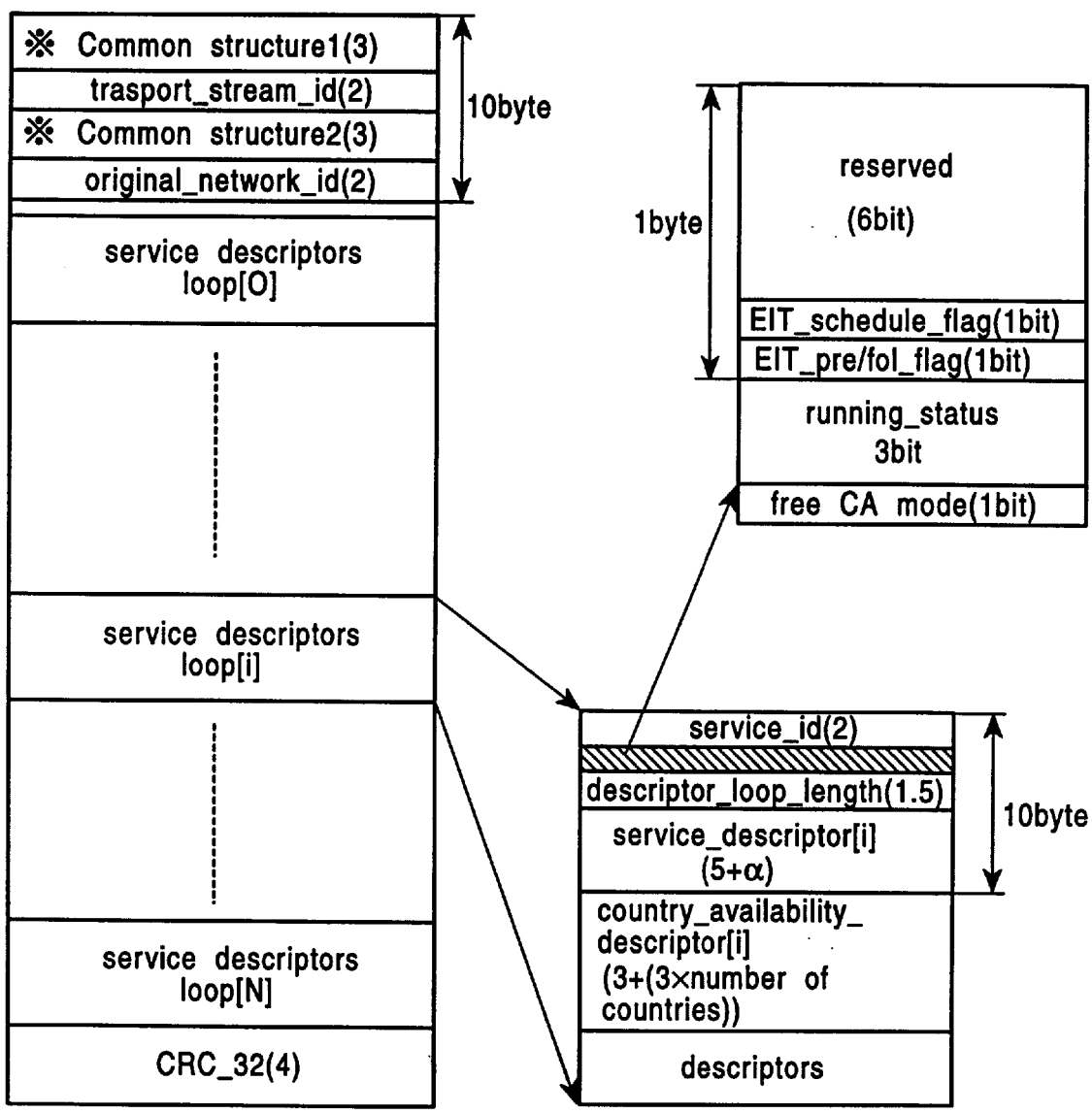
FIG. 14 illustrates the data structure of the service description table included in the EPG data.

FIG. 14 illustrates the data structure of the SDT (Service Descriptor Table). The SDT includes data representing the services included in the system, such as the service name, the service provider, etc. The number in parentheses in FIG. 14 represents the number of bytes used to represent the information identified thereby. The leading 10 bytes are used as a header that is formed of common structure 1(3), transport stream identification (transport stream_id (2)), common structure 2(3), and original network identification (original_network_id(2)). The transport stream ID may be thought of as a label for distinguishing the transport stream from the SDT from other transport streams multiplexed in the same delivery system. The original network ID may be thought of as a label for identifying the network which serves as the source of the delivery system.

Following the header are service descriptors loop [0] to service descriptors loop [N] and, finally, error-correcting code CRC_32(4). Each service descriptors loop includes service_id(2), six reserved bits, EIT_schedule_flag, EIT present/following_flag, running_status, and free_CA_mode. The service_id serves as a label for distinguishing the service in this descriptor from the other services in the same transport stream. The service_id performs the same function as the program number (program_number) in the corresponding program map table (PMT) (program_map_section) of FIG. 18. The EIT_schedule_flag indicates the presence or the absence of the EIT_schedule information in the EIT transport stream. The EIT_present/following_flag represents the presence or the absence of the EIT_present/following information in the EIT transport stream. The running status designates the status of the service (or program), such as whether the service (or broadcast channel) has or has not yet started, is beginning to start in a few minutes (this is useful for setting up a VCR for recording), has already started, or is currently suspended. The free_CA_mode indicates whether the service or broadcast channel can be accessed free of charge or is controlled by a conditional access system (such as pay per view, premium subscriber, etc.).

Following the free_CA_mode bit is the descriptor_loop_length to identify the overall byte length of subsequent descriptors. The adjacent service_descriptor[i] supplies the name of the service_provider and the name of the service in text format, as well as the service_type. The next following country_availability_descriptor[i] represents a list of the countries that can access the service and a list of the countries that cannot. The subsequent descriptors include the promotion description.

Figure 15:
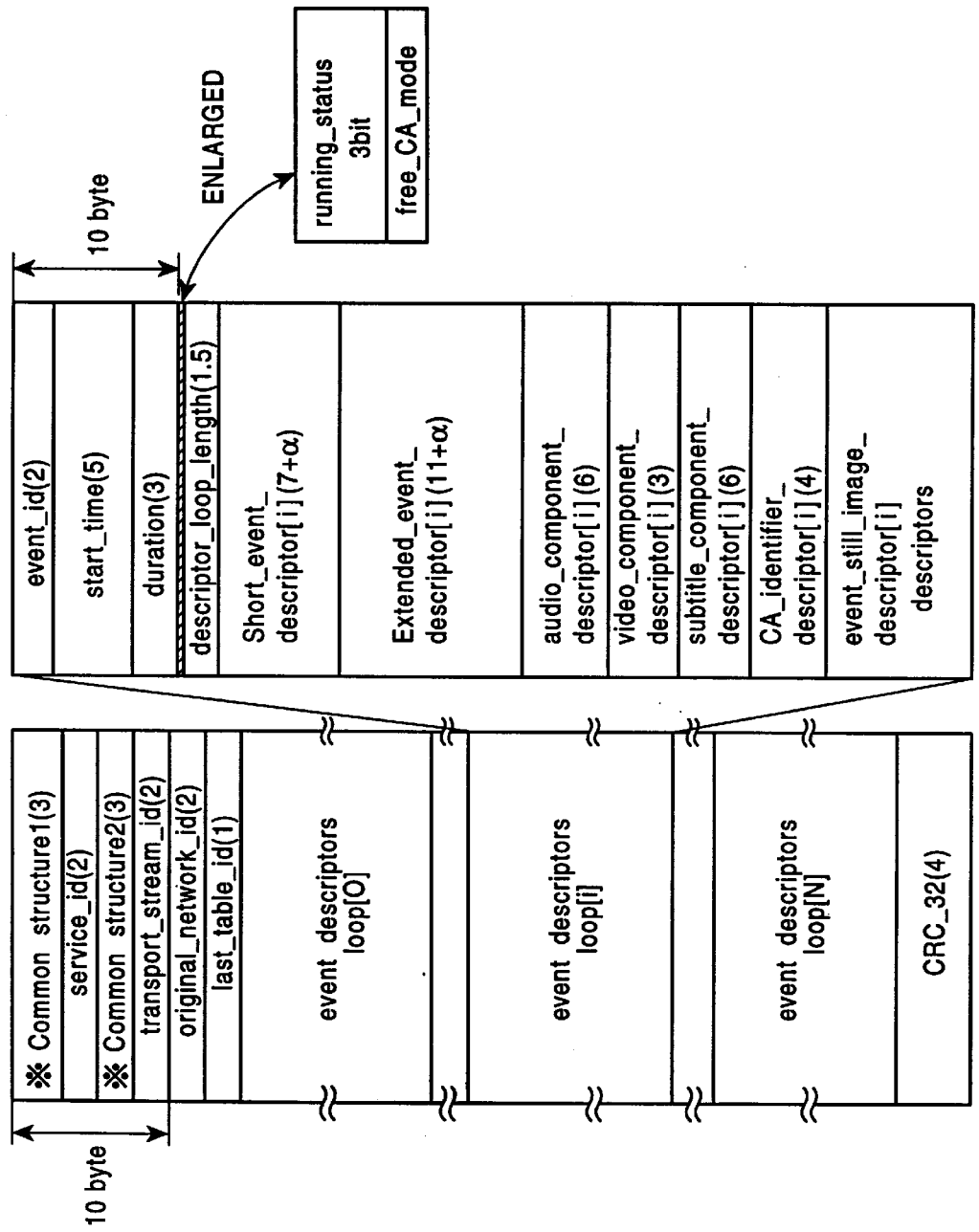
FIG. 15 illustrates the data structure of the event information table included in the EPG data.

FIG. 15 illustrates the data structure of the Event Information Table (EIT). The leading 10 bytes are used for the header that is formed of the common structure 1(3), service_id(2), the common structure 2(3), and the transport stream identification transport_stream_id(2). Following the header is the original_network_id(2) and a last_table_id(1). The last_table_id(1) identifies the final (or maximum) table_id. If only a single table is used, the table_id is set. If table_id assumes consecutive values, this information is stored in chronological order. There follow event descriptors loop[0] to event descriptors loop[N] and finally, CRC_32(4).

Each event descriptors loop includes event_id(2) to provide the identification number of the event (or program) that is described, and start_time (5) for displaying the start time of the event in Universal Time Coordinates (UTC) and Modified Julian Day Coordinates (MJD). In this start time field, 16 least significant bits (LSB) of the MJD-displayed data are provided, and six digits represented by four-bit binary-coded decimal (BCD) symbols, or 24 bits. For example, 93/10/12 12:45:00 can be coded as 0XCO78124500. Following the start time data is the duration (3) which represents the duration of the event (program) in hours, minutes and seconds. Thereafter are the running_status, free_CA_mode, and descriptor_loop_length (1.5). Then, Short_event_descriptor[i](7+α) is provided to identify the event name and provide a short description of the event such as in the form of the program table. Then follows Extended_event_descriptor[i](11+α) to provide a more detailed description of the event (such as in the format of the program content shown in FIG. 10) than the description provided by the Short event descriptor.

Thereafter are audio_component_descriptor[i](6), video_component_descriptor[i](3), and subtitle_component_descriptor[i](6). The subsequent CA-identifier_descriptor[i](4) indicates whether the event is scrambled, whether reception is restricted, such as whether a charge is required for reception, and so on. Finally, other descriptors, such as event_still_image_descriptor[i] representing the data of the program window (still-picture data) shown in FIG. 6, are provided.

Figure 16:
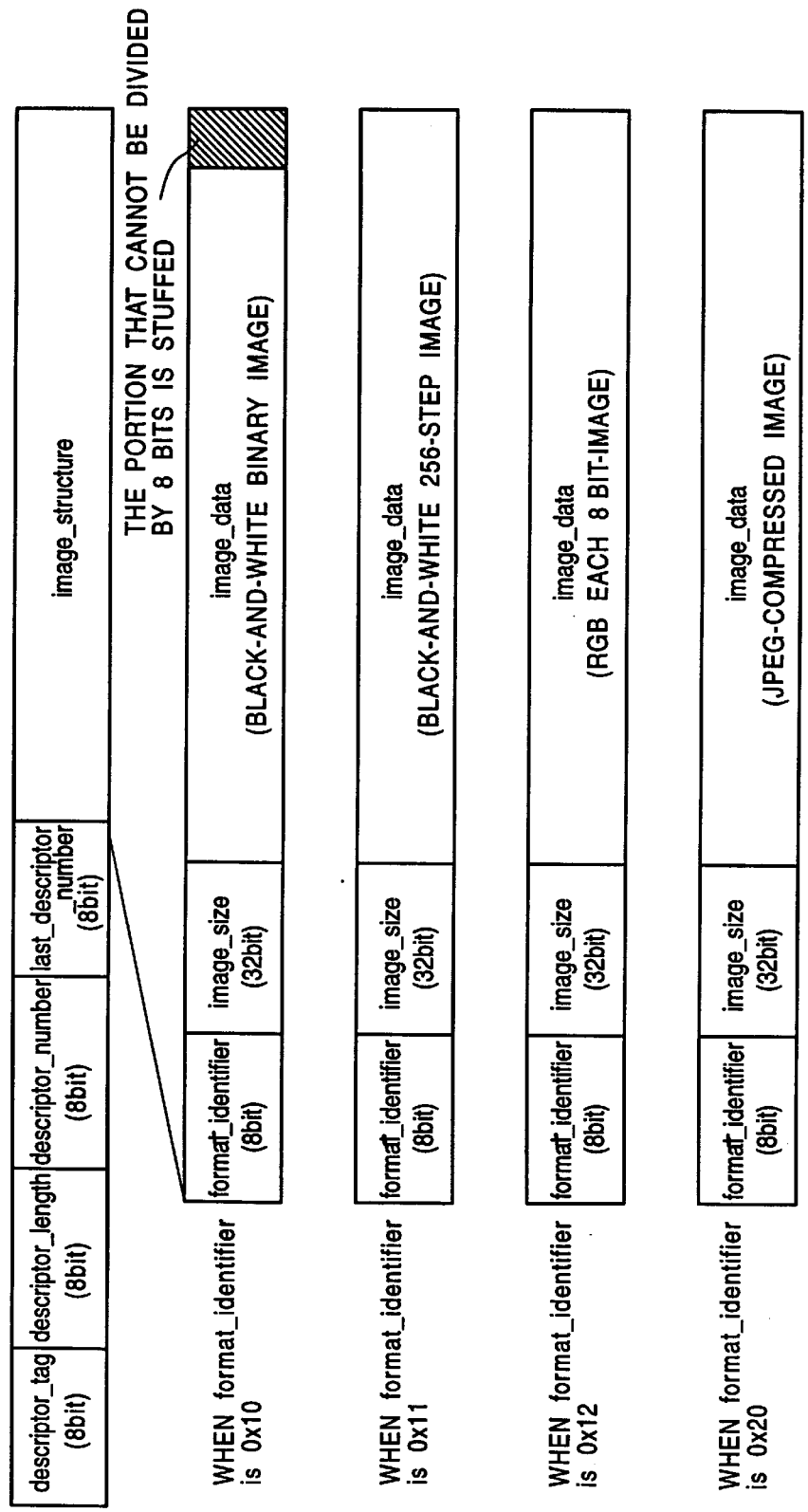
FIG. 16 illustrates the data structure of still picture data.

FIG. 16 illustrates the structure of the event_still_image_descriptor[i] (still-picture format). As shown in FIG. 16, an 8-bit descriptor-tag is disposed as leading data to represent that the information which follows is still-picture data. Then, 8-bit descriptor-length indicates the overall format length; and 8-bit descriptor-number and 8-bit last-descriptor-number designate the number of the descriptor and the last (maximum) descriptor, respectively. Finally, image_structure representing substantial image data of the still picture is positioned. This image_structure is formed of an 8-bit format_identifier, a 32-bit image_size indicator and the image_data itself. The format_identifier represents the ID of the image_data. When the format_identifier is 0×10, the image_data is identified as black-and-white binary image data. If the format_identifier is 0×11, the image_data is identified as black-and-white 256-step image data. If the format_identifier is 0×12, the image_data is identified as RGB image data, with each color being formed of 8 bits. When the format_identifier is 0×20, the image_data is identified as having been compressed by the JPEG technique. In the embodiment shown in FIG. 1, the reduced-size still image frame forming the program window is compressed by the JPEG technique, and the format_identifier is 0×20. When the image_data is binary black-and-white image data, the number of bits included therein may not be an integral multiple of 8 bits, in which case, "dummy data" is stuffed into the image_data field to "fill in" this field.

Figure 17:
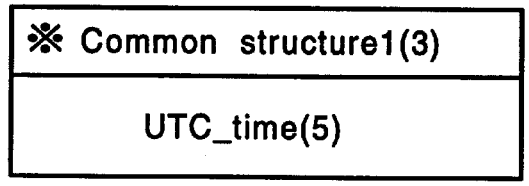
FIG. 17 illustrates the data structure of the time and data table included in the EPG data.

FIG. 17 illustrates the structure of the Time Data Table (TDT). The TDT is formed of the common structure 1(3) and the UTC_time(5). In addition to the above-described tables, the Service Information (SI) includes the Program Map Table (PMT) shown in FIG. 18 and the Program Association Table (PAT) illustrated in FIG. 19.

Figure 18:
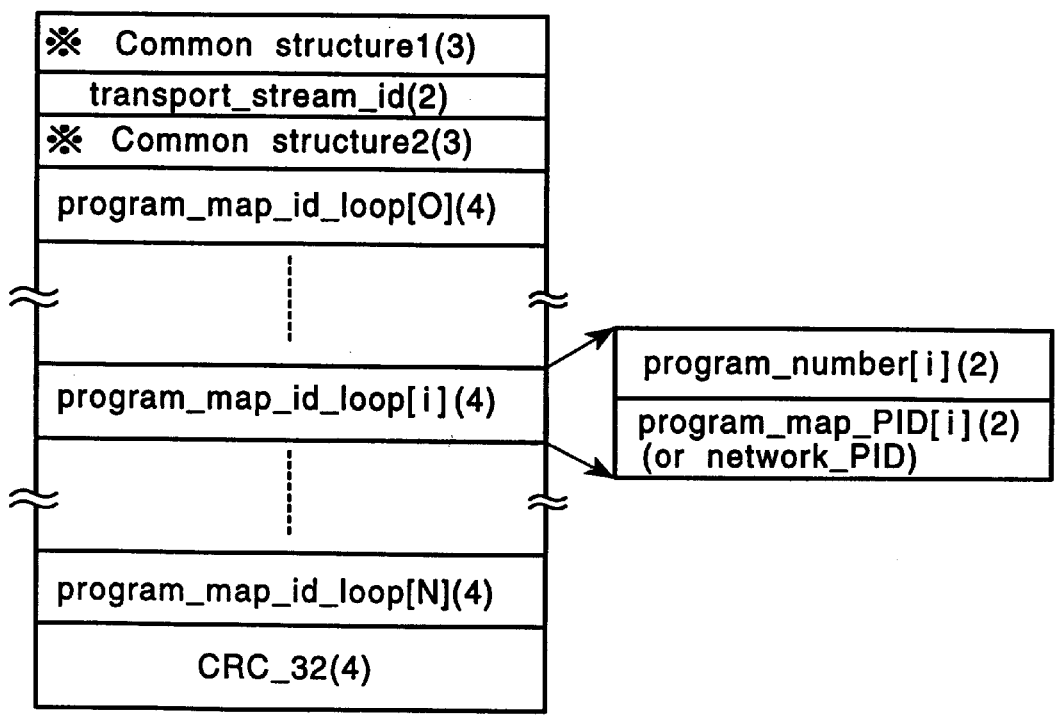
FIG. 18 illustrates the data structure of the program map table included in the EPG data.

The PMT includes, as shown in FIG. 18, the common structure 1(3), the transport_stream_id(2), the common structure 2(3), and program_map_id_loop[0](4) to program_map_id_loop[N](4). Finally CRC_32(4) is provided. Each program_map_id_loop[i](4) is formed of program_number[i](2) and program_map_PID[i](2) (or network PID) wherein PID represents packet id. The program_number represents the program used to implement the corresponding program_map_PID. For example, when the program number is set to 0×0000, the PID in the next-following program_map_PID acts as network_PID. The values of the program_number other than 0×0000 are defined by the user. In this program_number field, the same value cannot be taken in the Program Association Table (PAT). For example, if the program_number is used for specifying the broadcast channel, the network_PID defines the PID of a transport stream packet including the Network Information Table (NIT). Although the value of the network_PID (as well as the value of the program_map_PID) can be defined by the user, the user cannot assign a value reserved for another use. The presence of the network_PID is optional. The program_map_PID specifies the PID of a transport stream packet containing the effective PMT for the program defined by the program_number. Two or more program_map_PIDs cannot be allocated to the program_number.

Figure 19:
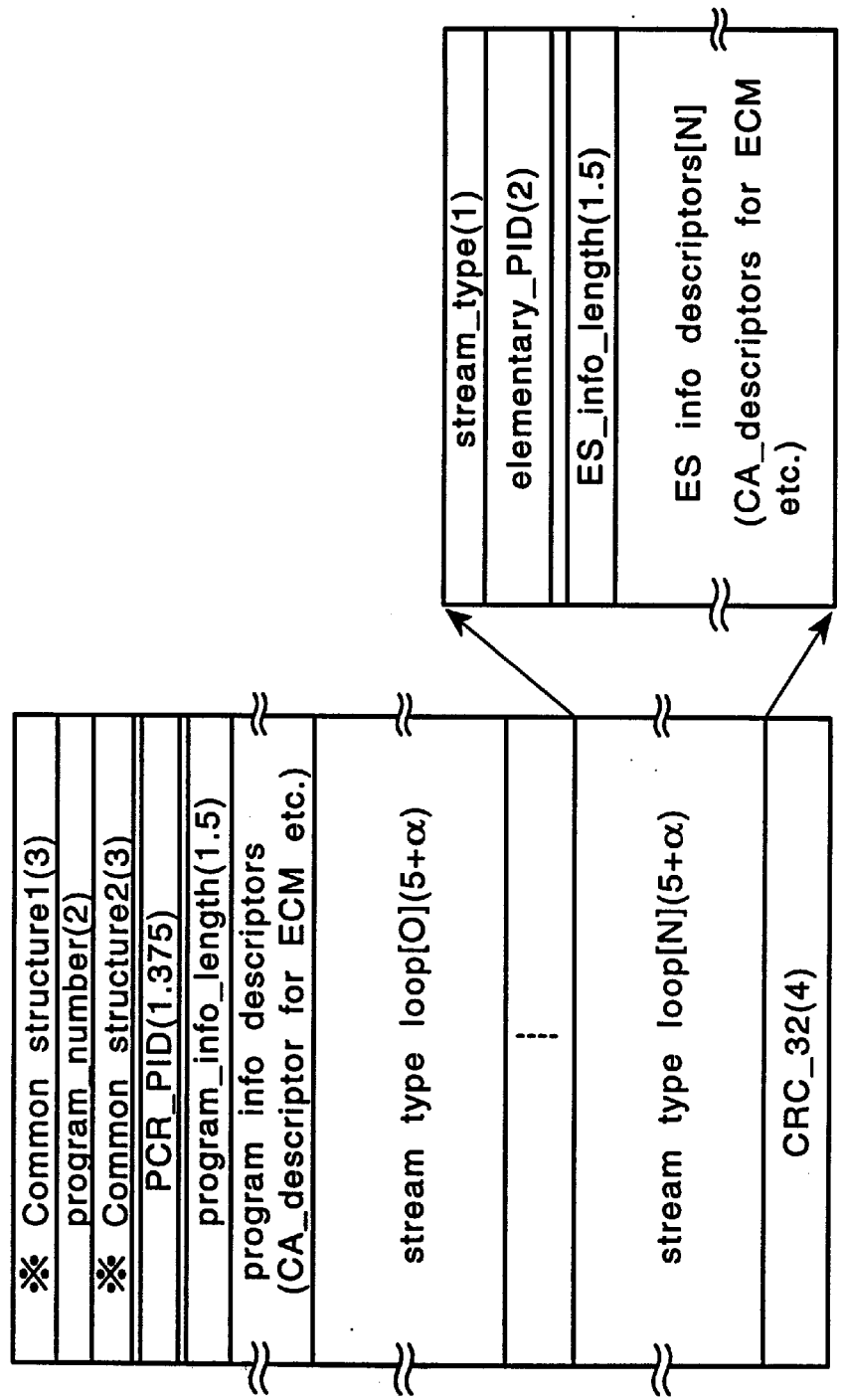
FIG. 19 illustrates the data structure of the program association table included in the EPG data.

In the PAT illustrated in FIG. 19, the 10-byte header is formed of the common structure 1(3), a program_number (2), the common structure 2(3), and PCR_PID(1.375). The PCR_PID indicates the PID of the transport stream packet that includes the program clock reference (PCR) field effective for the program defined by the program-number. If there is no PCR related to the defined program with respect to a private stream, this field assumes the value of 0×1FFF. There follows program_info_length(1.5) to specify the byte number of the following descriptor, and then the program info descriptors, including CA_descriptor, Copyright_descriptor, Max_bitrate_descriptor, etc. Thereafter are stream type loop[0](5+α) to stream type loop[N](5+α), and CRC_32(4). Each stream type loop includes stream_type (1) and elementary PID(2). The stream_type defines the type of payload or indicates that the elementary stream transmitted in a packet has the PID specified by the elementary_PID. The value of the stream_type is defined by the MPEG2 technique. The elementary_stream_PID specifies the PID of the related elementary stream and the PID of the transport stream packet which transmits this data. Following the elementary_PID are 12-bit ES_info_length (1.5): the first two bits of which are 00, and after these bits the byte number of the descriptor of the following related elementary stream. Then follows ES info descriptors[N] which include CA_descriptors and other descriptors.

Figure 20:
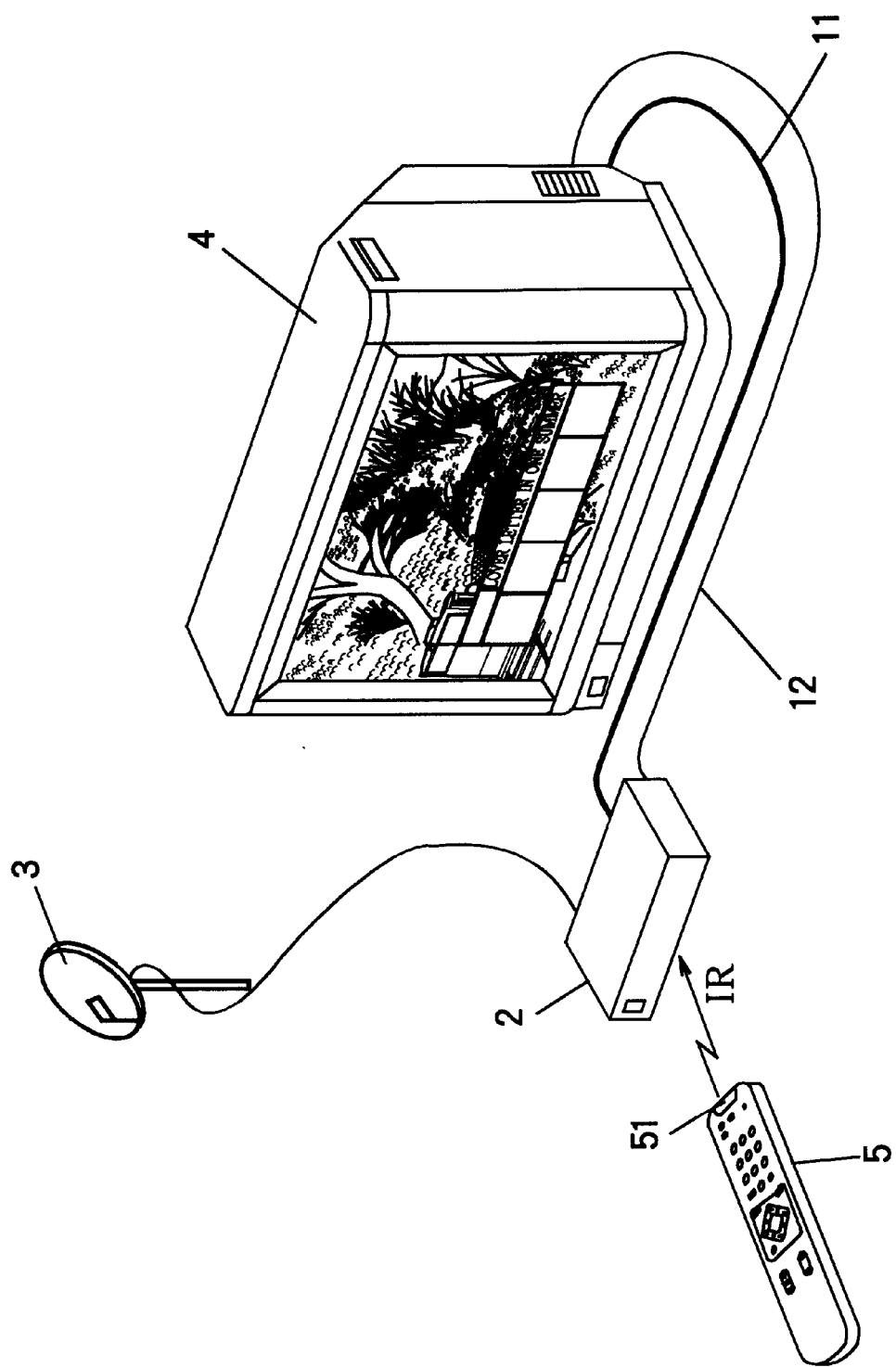
FIG. 20 illustrates a video receiving system which incorporates the present invention.
Figure 24:
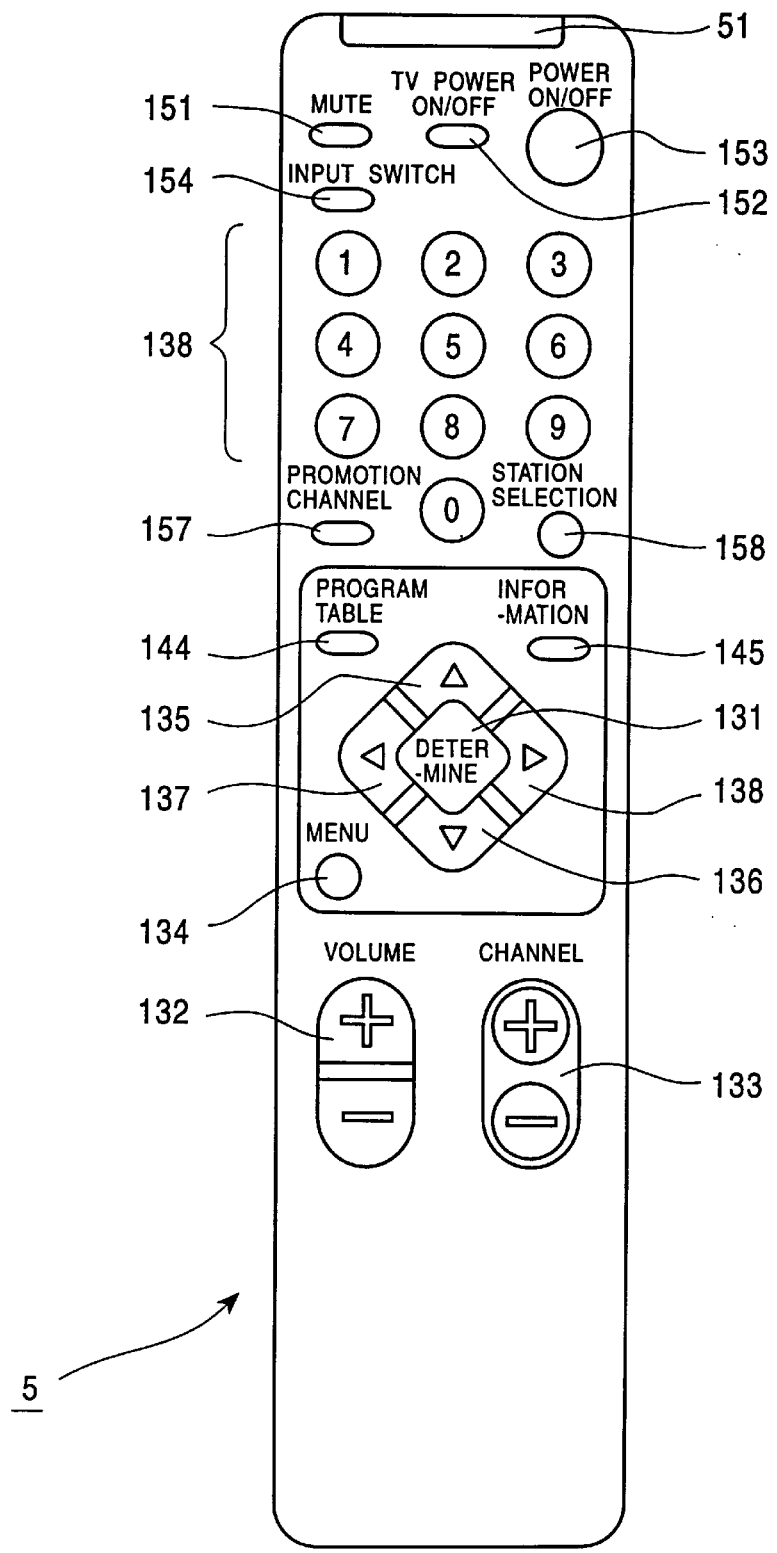
FIG. 24 illustrates a remote control device which utilizes the present invention.

One representation of receiving apparatus which incorporates the present convention is illustrated in FIG. 20. Here, the receiving apparatus is referred to generically as audio/video equipment 1 which comprises a receiver/decoder 2 coupled to a suitable antenna 3 for receiving and decoding the multiplexed program and EPG data transmitted by the apparatus shown in FIG. 1 and for supplying the decoded program and EPG data to a monitor 4 for display. Antenna 3 may comprise a DSS dish receiver, a communications satellite antenna or other suitable antenna equipment adapted to receive the program and EPG data. Receiver/decoder 2 is described in greater detail below and is responsive to infra-red (IR) signals transmitted thereto from a suitable IR module 51 included in a remote control device 5. The functions commanded by the remote control device are described in greater detail below; and FIG. 24 is a clear representation of one embodiment of the remote control device. It will be appreciated that remote control device 5 is operable to select broadcast channels, adjust the audio volume and utilize the EPG data, as discussed above.

Receiver/decoder 2 is coupled to a monitor 4 by suitable connecting leads 11 and 12. In the preferred embodiment, connecting lead 11 supplies video and audio information to the monitor and connecting lead 12 supplies control signals thereto. For example, connecting lead 11 may include two or three separate lines, one for RF video, one for left-channel audio, and one for right-channel audio signals. Connecting lead 12 may supply suitable commands to the monitor such as audio volume control, picture characteristic control, power on/off control, and the like. It will be understood that monitor 4 may comprise a conventional television receiver connected to the receiver/decoder in much the same way as conventional television receivers are connected to cable set-top boxes. Alternatively, monitor 4 may comprise a multimedia monitor known to those of ordinary skill in the art.

Figure 21:
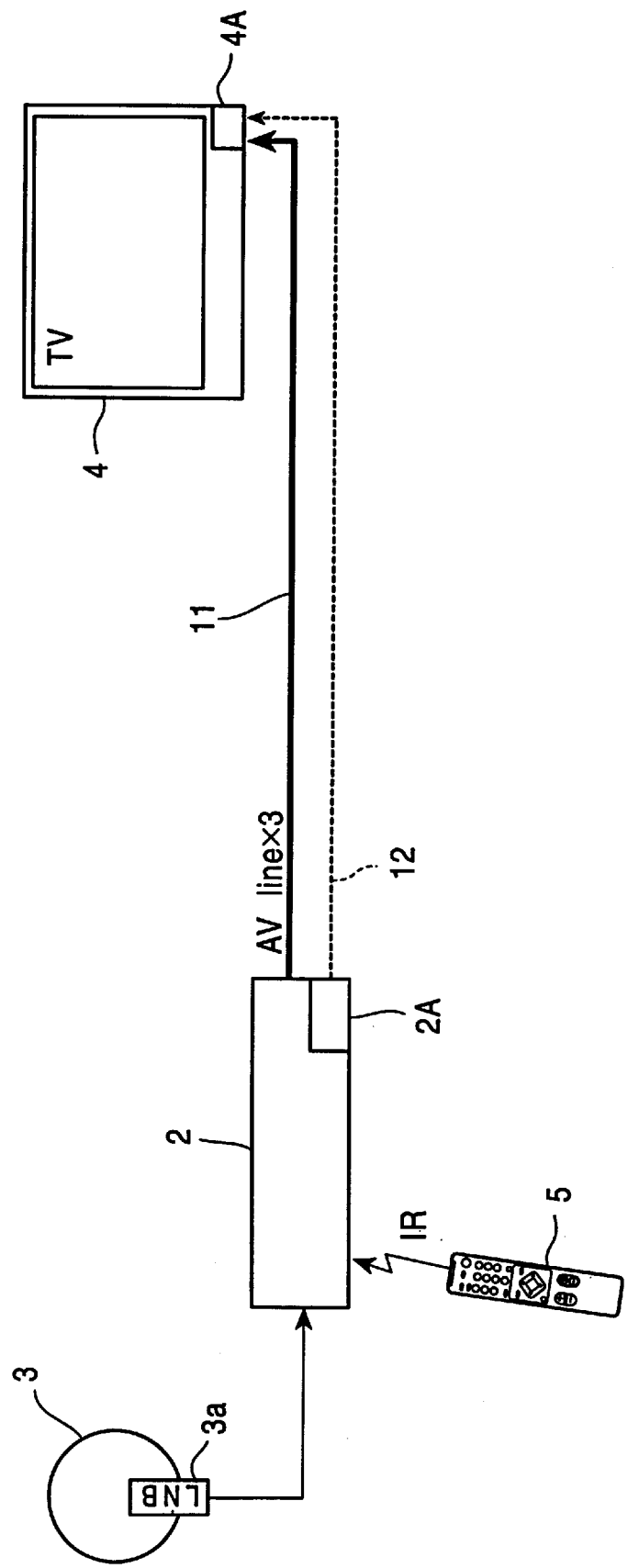
FIG. 21 is a block diagram of the electrical connections shown in FIG. 20.

FIG. 21 is a schematic representation of the electrical connections between receiver/decoder 2, antenna 3 and monitor 4. For completeness, FIG. 21 also depicts remote control device 5. Antenna 3 is coupled to receiver/decoder 2 by a low noise block (LNB) downconverter 3a which, as is known, converts a satellite-transmitted signal to a signal of suitable frequency compatible with consumer video devices, such as receiver/decoder 2. The receiver/decoder supplies to monitor 4 audio and video signals via connection 11, as mentioned above and as will be described below in conjunction with FIG. 23.

Control signals also are transmitted between the receiver/decoder and the monitor, such as between control sections 2A and 4A, provided on these respective devices.

Figure 22:
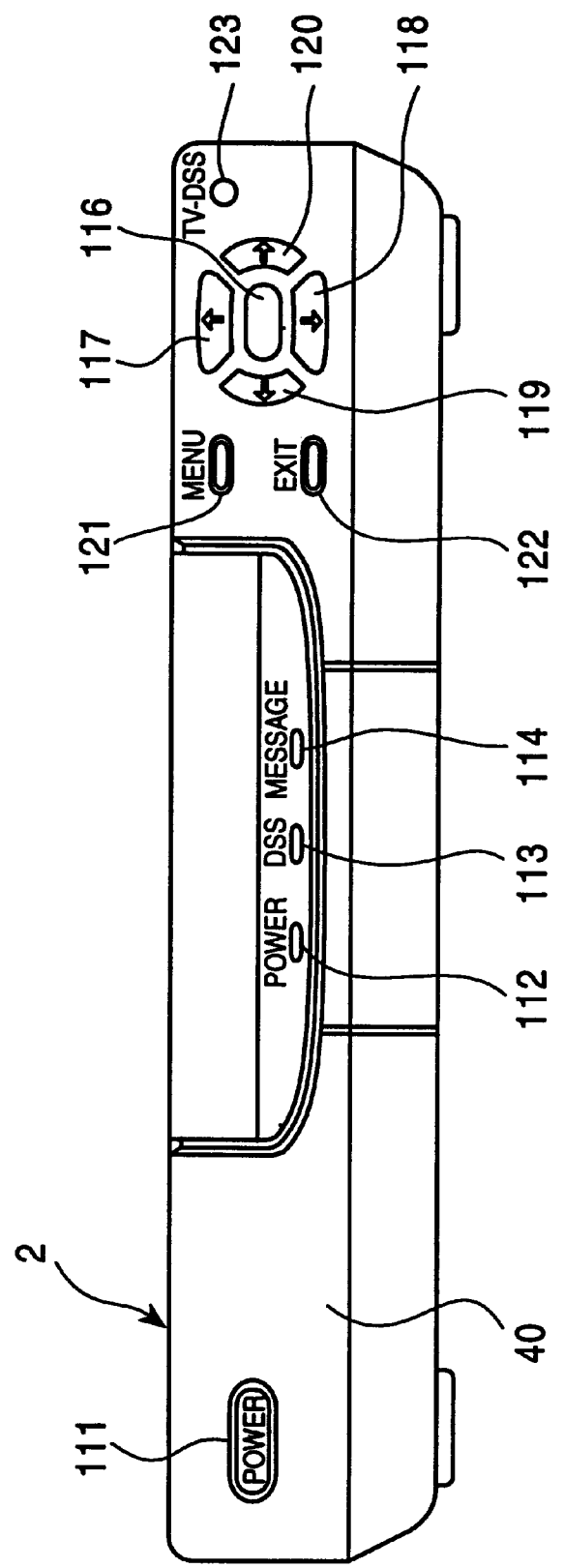
FIG. 22 illustrates the receiver/decoder 2 of FIG. 20.

FIG. 22 illustrates one embodiment of receiver/decoder 2, which includes a power on/off button 111 disposed on a front panel 40 thereof. A suitable power indicator 112, such as an LED, displays whether power is supplied to the receiver/decoder. Additional LEDs 113 and 114 also are provided, to indicate whether the receiver/decoder is operable to receive broadcast channels transmitted via satellite, such as by DSS transmission, or via conventional over-the-air (or cable) transmission. A TV/DSS changeover button 123 selects the TV or DSS mode of operation.

Satellite communication provides substantial flexibility and the ability for a service provider to transmit individual messages to the consumer. For example, a message relating to subscription charges, bill payment, and the like, may be transmitted, and an indication of receipt of such a message is provided by a message LED 114. This LED is reset when the consumer retrieves and displays the message on, for example, monitor 4.

Receiver/decoder 2 is provided with a menu switch 121 which, when operated, displays a menu on the display screen of monitor 4. This display is cleared in response to the operation by the user of an exit button 122.

Cursor positioning buttons 117–120 are user-operated to move a cursor display, such as shown in FIG. 4, on the display screen. The cursor thus may be moved to a desired EPG still image or to a particular location on the displayed program table (FIG. 8). A select button 116 may be operated by the user to select a particular program identified by the position of the cursor. In a preferred application of this invention, the operation of select button 116 sets the receiver/decoder to the particular broadcast channel at the particular time identified by the EPG data that has been selected by the cursor. For example, and as described above, receiver/decoder 2 is tuned to the broadcast channel which carries the program identified by the EPG still image at which the cursor is positioned.

Figure 23:
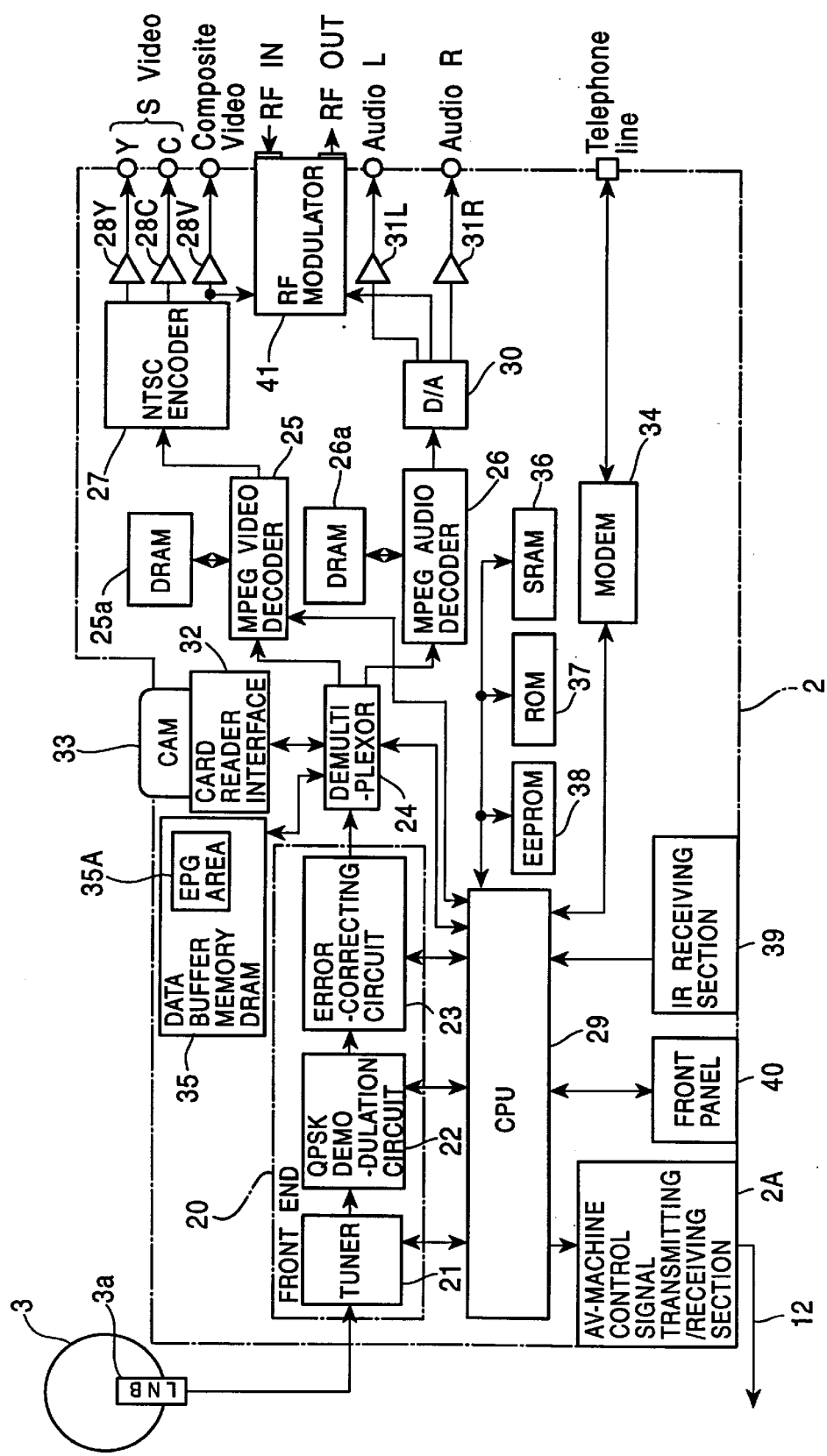
FIG. 23 is a block diagram of one embodiment of a receiver/decoder in accordance with the present invention.

A block diagram of one embodiment of receiver/decoder 2 which incorporates the present invention is illustrated in FIG. 23. The receiver/decoder is provided with a front end 20, a CPU 29, a demultiplexer 24, a data buffer memory 35 and MPEG decoders 25 and 26. Front end 20 is coupled to antenna 3 by way of LNB downconverter 3a to receive the several broadcast and promotion channels that are received by the antenna. The front end includes a tuner 21 operable to be tuned to a particular broadcast or promotion channel in order to receive the data transmitted over that channel. The output of tuner 21 is coupled to a quadraphase shift key (QPSK) demodulator 22 which recovers the program and EPG data transmitted over the broadcast channel to which tuner 21 is tuned. The demodulated digital data then is subjected to error correction by error correcting circuit 23, whereupon the recovered program and EPG data are supplied to demultiplexer 24.

CPU 29 is coupled to tuner 21, QPSK demodulator 22, error correcting circuit 23 and demultiplexer 24 to control the individual operations of such circuits. For example, the CPU controls the tuning operation of tuner 21 in a manner conventionally used to control video and audio tuners. The CPU also is coupled to control section 2A to control the various control signals transmitted from receiver/decoder 2 to monitor 4 and, likewise, to detect, decode and interpret control signals that are returned to the receiver/decoder from the monitor. Front panel 40 is coupled to the CPU, whereby the CPU detects when power on/off button 111 is operated. Also, an IR receiving section 39 is coupled to CPU 29 to supply to the CPU various commands that are generated by remote control device 5 and supplied as IR signals to the receiver/decoder.

As mentioned above, one or more of the broadcast channels may carry pay-per-view programs, special programs referred to as "premium" programs and other programs requiring preestablished subscription, clearance or acceptance. The program data transmitted over such broadcast channels is scrambled and encrypted, thereby providing security against the unauthorized decoding and display of such programs. Demultiplexer 24 preferably includes decrypting circuitry requiring the presence of a decrypting key and decrypting software in order to decode such encrypted programs. An interface 32 is coupled to demultiplexer 24 and includes suitable circuitry which, for example, may be mounted on an IC card having a CPU, ROM, RAM and other conventional digital circuits typically used to decipher encrypted digital data. A conditional access module (CAM) 33 may include some or all of the aforementioned digital circuits, thereby providing the demultiplexer with the deciphering key needed to decrypt the received programs. CAM 33 also stores payment information and other data relevant to the user's account with the service provider to prevent unauthorized access to and use of the decrypting software and deciphering key.

Demultiplexer 24 supplies to data buffer memory 35 the decrypted program and EPG data received from front end 20. The buffer memory may be comprised of a DRAM and may include an EPG area 35A in which the EPG data is especially stored. As will be described below, the EPG area stores EPG image and text data which are selectively retrieved and displayed as, for example, the still image data shown in FIG. 4, the still image and text data shown in FIG. 7, the program tables shown in FIGS. 8 and 9 or the detailed program information shown in FIG. 10.

Although buffer memory 35 is shown as a DRAM, it will be appreciated that the program and EPG data may be stored in a static random access memory (SRAM), if desired. The buffer memory also stores the audio data that is recovered from the broadcast channel by front end 20.

Demultiplexer 24 is controlled by CPU 29 to read from buffer memory 35 the video and audio program data that had been received by front end 20 and separated by the demultiplexer. It is recalled that the video and audio data which are received by receiver/decoder 2 are in compressed form; and demultiplexer 24 reads the compressed video data from the buffer memory and supplies same to MPEG video decoder 25. Similarly, the demultiplexer reads the stored compressed audio data from buffer memory 35 and supplies same to MPEG audio decoder 26. The MPEG video decoder cooperates with a memory DRAM 25a and the MPEG audio decoder cooperates with a memory DRAM 26a to store the compressed video and audio data, respectively, and to perform a decoding/decompression operation thereon. MPEG decoding techniques are known to those of ordinary skill in the art and form no part of the present invention per se. Hence, further description of such MPEG decoding of the video and audio data is not provided herein.

MPEG decoder 25 supplies the decoded video signals to, for example, an NTSC encoder 27 whereat the video information is encoded into luminance and chroma signals Y and C and into a composite video signal. The luminance and chroma signal Y and C are supplied to respective outputs by buffer amplifiers 28Y and 28C, respectively, these outputs constituting what is known conventionally as the so-called S video output. The composite video signals are supplied to a composite video output by a buffer 28V. In addition, the composite video signal is coupled to an RF modulator 41 which supplies an RF video output that is compatible with conventional receivers.

Similarly, MPEG audio decoder 26 recovers digital audio data from the audio program data supplied thereto; and this audio data is converted to analog form by a D/A converter 30. The D/A converter produces left-channel and right-channel stereophonic audio signals which are coupled to left and right outputs by way of buffer amplifiers 31L and 31R, respectively. A monaural audio signal also is supplied from D/A converter 30 to RF modulator 41, whereat the audio signal is combined with the composite video signal supplied from NTSC encoder 27, thereby forming a composite television signal at the RF output of the RF modulator. This composite television signal output is produced by the RF modulator when TV/DSS selector button 123 is operated to select the DSS mode. When, however, the TV mode is selected, RF modulator 41 essentially bypasses whatever outputs may be supplied thereto by the NTSC encoder and the D/A converter 30 so as to shunt to the RF output whatever signals may be supplied to the RF input thereof. Thus, receiver/decoder 2 may be used to couple to monitor 4 signals that may be coupled to the receiver/decoder from a VCR, a personal computer or other audio/video device. Hence, the receiver/decoder may be used to receive several different types of signals connected thereto via separate input ports and to select one of those signals to be supplied to monitor 4 via the RF output.

FIG. 23 illustrates various memory devices 36, 37 and 38 which, typically, are used with CPU 29 to control the operations of the CPU and to permit the CPU to carry out various processing functions. For example, ROM 37 stores the operating program for the CPU which permits the processor to execute the tuning control function, QPSK demodulation function, error correction function and data detection, separation and decoding functions. EEPROM 38 stores data relating to the operation of the receiver/decoder that otherwise would be erased when the power is turned off. For example, the EEPROM stores the identity of the last broadcast channel to which tuner 21 had been tuned prior to power turn-off, the identities of those broadcast channels to which the tuner had been tuned the most during, for example, the last four weeks (e.g. an indication of the user's "favorite" channels), the tuning history of tuner 21, and the like. As a result of this stored data, when power is turned on, CPU 29 controls tuner 21 to tune either to the last broadcast channel that had been received prior to power turn-off or to the broadcast channel which is determined to be the user's favorite channel. The program stored in ROM 37 preferably determines which of these alternatives is selected. The EEPROM and the ROM also are used to control CPU 29 to maintain an appropriate timing function, even when power is turned off. For example, this enables the CPU to maintain the current time in hours, minutes, seconds and also to control timed functions, such as to supply to a VCR connected thereto via control line 12 a Start Signal when a particular time is reached, thereby initiating a timed (or programmed) recording operation. SRAM 36 is used as a working memory for CPU 29 to assist in the aforementioned and other processing operations.

It is recalled that, to reduce the amount of EPG data that must be transmitted in order to effect the displays shown in, for example, FIGS. 4–10, the total amount of data needed to display the various icons and logos preferably are not transmitted as part of the EPG data. Rather, such graphic display data is pre-stored in a suitable area of DRAM 25a and access data, such as bit-map data, is transmitted as part of the EPG data and used to access such pre-stored display data. CPU 29 is coupled to MPEG video decoder 25 to control the MPEG video decoder to retrieve such display data from DRAM 25a when the CPU senses the receipt by the multiplexer 24 of such access data. The stored display data then is read from the DRAM, decoded (i.e. MPEG-expanded) by decoder 25 and supplied to NTSC encoder 27 for superposition on the video display, thereby resulting in the display of such icons and logos in the manner depicted in FIGS. 4–10. As will be described below in conjunction with FIG. 28, the EPG data stored in, for example, EPG area 35A of buffer 35 is read from the EPG area, temporarily stored in a dedicated area of DRAM 25a, referred to as an On Screen Display (OSD) area and retrieved from the OSD area by MPEG decoder 25 to form the EPG display shown in FIGS. 4–10.

FIG. 23 also illustrates a modem 34 for interconnecting CPU 29 to, for example, a telephone line. The modem is used to exchange billing information, deciphering keys, decrypting software, and the like between receiver/decoder 2 and the service provider.

Referring to FIG. 24, there is illustrated one embodiment of remote control unit 5 that advantageously is used with the present invention. As shown, the remote control unit is provided with various operator-actuated selector switches which, preferably, are configured as pushbuttons and are referred to herein simply as "buttons". FIG. 24 also illustrates the IR transmitter 51 which transmits to receiver/decoder 2 various commands generated by the operation of one or more of the illustrated buttons via infra-red transmission.

The buttons which are used primarily in conjunction with displaying the EPG data that is transmitted to and stored in receiver/decoder 2 are provided in the generally central portion of the remote control unit. Cursor control buttons 135, 136, 137 and 138 are operated to move the cursor across the display screen in the directions represented by the arrows shown on these buttons. For example, the cursor may be positioned at or adjacent a desired still picture shown in FIG. 4 or at a desired program table entry shown in FIGS. 8 or 9, whereupon the operation of button 131 selects the program identified by that still picture. The operation of button 145 retrieves from buffer memory 35 the EPG data illustrated in FIG. 7, which then is displayed. Alternatively, the operation of button 158 causes CPU 29 to control tuner 21 to tune to the broadcast channel on which the program identified by the selected still picture is transmitted.

The operation of button 134 causes CPU 29 to control MPEG decoder 25 to read from DRAM 25a menu display information that is stored in the OSD area of the DRAM. This menu information may be of the conventional type normally used with television receivers, VCR's and the like, and also may permit the user to select different types of EPG displays, such as the still picture display shown in FIG. 4, the program table display shown in FIG. 8 or FIG. 9 or the program content display shown in FIG. 10. Button 134 may be used in conjunction with button 144 to enable a particular type of EPG display to be selected.

A numerical keypad 138 is operated to select a broadcast channel in the usual manner. A promotion channel may be selected for display simply by operating button 157. It is appreciated that when button 157 is operated, tuner 21 is tuned to the broadcast frequency of the promotion channel. Preferably, if plural promotion channels can be received, successive actuations of button 157 advance the tuner from one promotion channel to the next.

Channel up/down buttons 133 and volume up/down buttons 132 permit the user to scroll through successive broadcast channels and to increase and decrease the audio volume, as desired.

A power on/off button 153 controls power to the receiver/decoder. Similarly, a television power on/off switch 152 is used to control power supplied to monitor 4. The actuation of a mute switch 151 mutes the audio output of the monitor; and the actuation of switch 154 toggles the receiver/decoder between its satellite antenna input and conventional television input. It will be appreciated that switch 154 serves substantially the same function as switch 123 shown in FIG. 22.

Figure 25:
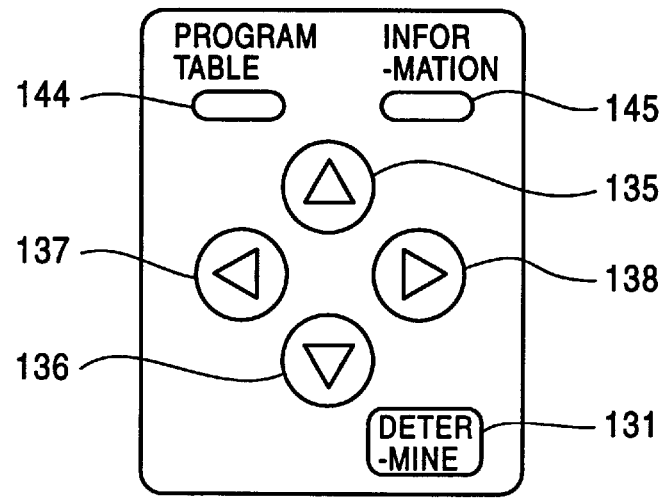
FIG. 25 illustrates an alternative embodiment of a portion of the remote control device shown in FIG. 24.

An alternative arrangement to the cursor control and EPG selection buttons is shown in FIG. 25. Here, button 131 simply is positioned adjacent the cursor-control buttons, rather than being surrounded by those buttons as shown in FIG. 24.

Figure 26:
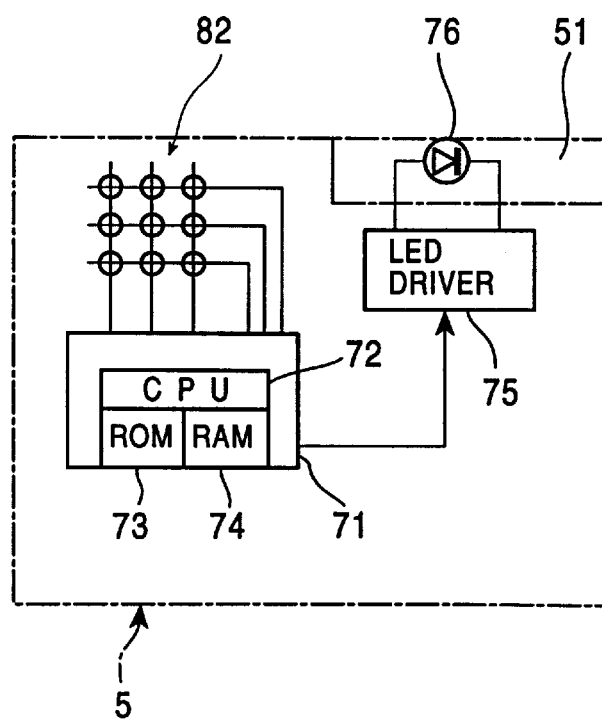
FIG. 26 is a schematic representation of a portion of the remote control device shown in FIG. 24.

FIG. 26 schematically illustrates the internal electrical connections between microcomputer 71 contained within the remote control device, button matrix 82 and IR transmitter 51. The microcomputer includes a CPU 72, a ROM 73 and a RAM 74, as is conventional. Button matrix 82 represents all of the pushbuttons shown in FIG. 24, and this button matrix is polled by the microcomputer to detect and determine which button is actuated. The command selected via that button is generated by the microcomputer and supplied to an LED driver 75 which drives an LED 76 included in IR transmitter 51. Thus, LED 76 transmits IR signals representing the command generated by microcomputer 71 in response to the actuation of a particular button included in button matrix 82.

Figure 27:
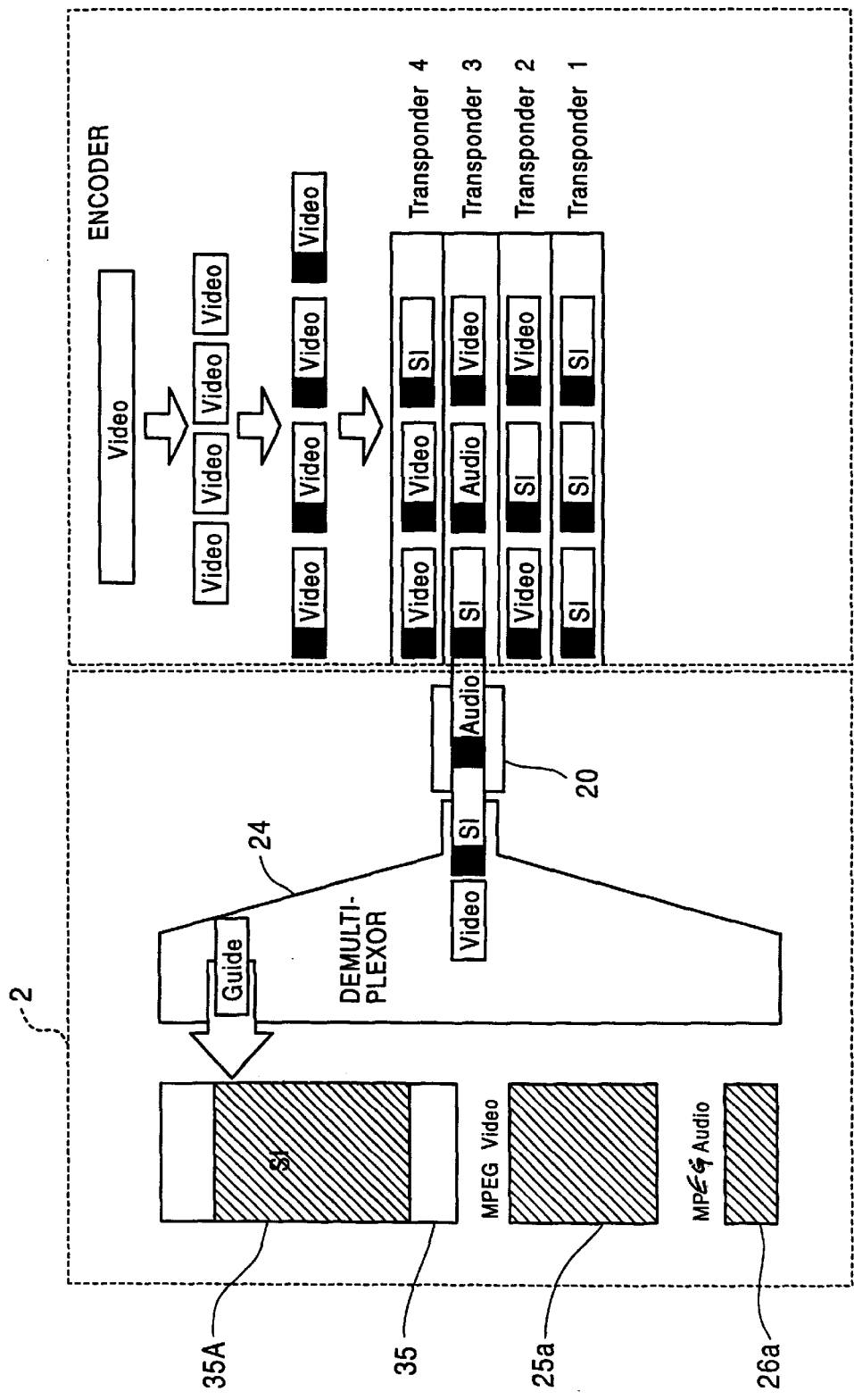
FIG. 27 schematically represents the manner in which EPG data is transmitted and received in accordance with the present invention.

FIG. 27 schematically illustrates the manner in which EPG data is combined with program data, transmitted by the guide and the normal transponders, and received by receiver/decoder 2. Program data is comprised of video data and audio data; and EPG data is included in service information (SI) data, the latter containing the EPG data as well as other data typically transmitted by the service provider. A packet is formed of the program and SI data; and successive packets are transmitted to a respective transponder (four transponders are illustrated in FIG. 27) at suitable frequencies, such as in the frequency range 12.25 GHz to 12.75 GHz. As an example, if the program data of one broadcast channel is structured as a packet, a normal transponder may be supplied with ten packets of program data representing the program information transmitted over 10 respective broadcast channels. The SI data is multiplexed with these packets, such as described above in conjunction with FIG. 1. Depending upon the number of transponders that are provided in a satellite, 10 times that number of broadcast channels are, of course, transmitted.

The packets of program and SI data transmitted by the various transponders are received by receiver/decoder 2; and as shown in FIG. 27, the program and SI information are separated from the respective packets. Front end 20 (discussed in conjunction with FIG. 23) may be tuned to the transmission frequency of a particular transponder, whereupon the packets of program and SI data received from that transponder are demodulated. The multiplexer 24 separates the program and SI data from the received packets and temporarily stores the separated data in data buffer 35. As is typical, each SI packet includes a header; and although this header is used for various detection and synchronizing purposes, it is not needed for the actual display of the EPG data. Hence, the EPG data included in the separated SI packet is stored in EPG area 35A of data buffer 35, as depicted in FIG. 27. The video packet, after being separated, is stored in DRAM 25a and the audio packet, after separation, is stored in DRAM 26a. MPEG decoder 25 thus decodes the video data stored in DRAM 25a and, similarly, MPEG decoder 26 then decodes the audio data stored in DRAM 26a.

As a numerical example, the transmission rate of each transponder channel is on the order of 30 Mbits/second. Consistent with MPEG encoding, video images exhibiting rapid motion are represented by MPEG data having a large number of packets. On the other hand, video images having relatively little motion, such as a news program, a talk show, or the like, may be represented by MPEG data having a smaller number of packets. A transponder thus transmits a smaller number of programs exhibiting rapid motion and a larger number of programs exhibiting relatively little motion. In this manner, the average number of packets transmitted by each transponder is about the same.

The manner in which EPG data is stored and retrieved at receiver/decoder 2 now will be explained in conjunction with FIG. 28. Depending upon the packet header data, CPU 29 controls demultiplexer 24 to direct the incoming data to the appropriate memory destination. For example, EPG data is directed to buffer memory 35, MPEG video data is directed to DRAM 25a and MPEG audio data is directed to DRAM 26a. The demultiplexer includes registers 24a which store the appropriate memory addresses into which the received EPG, video and audio data are directed. Of course, as mentioned above, all of the received data initially is stored temporarily in buffer memory 35, whereafter the data is distributed to the appropriate memory and to the proper addresses in that memory, namely to the EPG area 35a, to DRAM 25a and to DRAM 26a.

Figure 28:
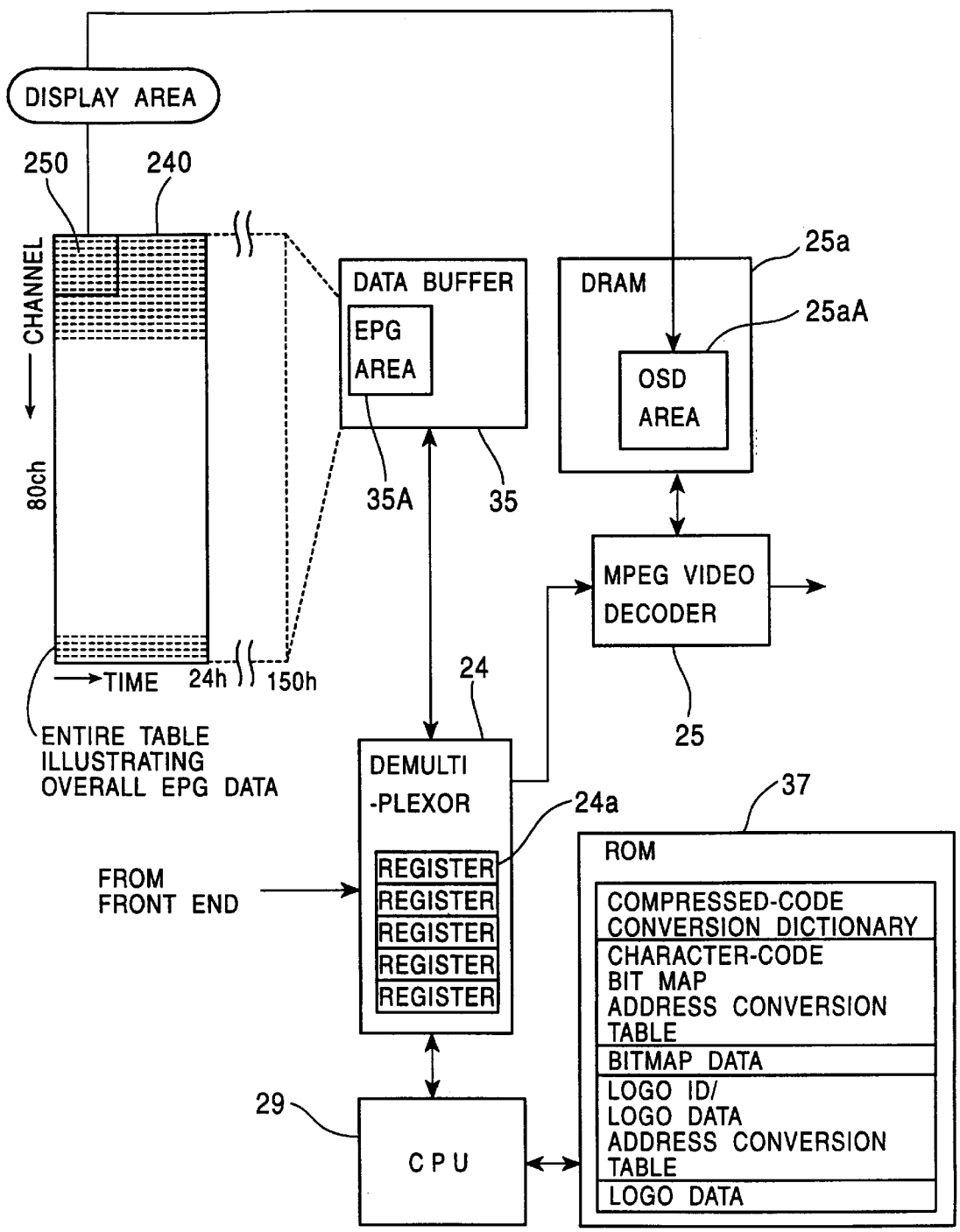
FIG. 28 is a block diagram of the manner in which EPG data is stored and retrieved at the receiver shown in FIG. 23.

FIG. 28 illustrates an enlarged version of EPG area 35a. It is seen that the EPG data received from a normal transponder contains, for each of, for example, 80 broadcast channels, still image data (EPG 1), and text data (EPG 2). As mentioned above, the text data contains program table data associated with 24 hours of programs transmitted over those 80 channels. The EPG text data also contains program content data associated with, for example, four hours of programs transmitted over those 80 channels. The EPG image data (EPG 1) and the EPG text data (EPG 2) are stored in the EPG area.

When EPG data is received from the guide transponder it is recalled that a larger amount of EPG data is present. In particular, the guide transponder transmits EPG text data (EPG 2+EPG 3) representing program table information associated with 150 hours of programs transmitted over 80 channels. The text data (EPG 2+EPG 3) also contains program content information associated with 70 hours of programs transmitted over those 80 channels. FIG. 28 schematically illustrates the storage in EPG area 35a of the EPG text data (EPG 2+EPG 3) transmitted by the guide transponder.

When the remote control device is operated to display the EPG data stored in EPG area 35a, the data stored in a discrete portion thereof, such as in a display area 250, is retrieved and written into OSD area 25aA of DRAM 25a. For example, when the user actuates button 144 of remote control device 5, the EPG image data identifying those programs which are currently being transmitted by, for example, all 80 of the broadcast channels are stored in the display area 250 and are read therefrom and written into the OSD area. Alternatively, if the user operates the remote control device for the purpose of displaying a table of EPG information, such as the table shown in FIG. 8, the EPG text data containing program table information for those programs transmitted over, for example, a four hour period are read from display area 250 and written into OSD area 25aA. MPEG video decoder 25 reads and decodes the data stored in OSD area 25aA and, as shown in FIG. 23, supplies the decoded EPG data to NTSC encoder 27 whereat the EPG data is superimposed on program video data and displayed on monitor 4, such as shown in FIG. 4 (if EPG image data had been written into the OSD area) or as shown in FIG. 8 (if EPG program table data had been written into the OSD area).

As depicted in FIG. 28, ROM 37, which contains the operating programs for CPU 29, includes a compressed code conversion dictionary which is used to expand compressed character data (i.e. the text data received by receiver/decoder 2) to a form suitable for display. The ROM also includes an address conversion table which is used by the CPU to read the appropriate character font in response to font bit map data that is included in the EPG data. ROM 37 also includes a logo data address conversion table which uses the aforementioned access data transmitted with the EPG data to read out the pre-stored logos and icons for display.

Therefore, it is seen that, by transmitting EPG image and text data, still image displays of the type shown in FIG. 4 may be presented to the user, thereby identifying those programs which currently are being transmitted as well as those programs which will be transmitted over respective broadcast channels. The user may display more detailed information relating to those programs, such as the display in FIG. 7, by operating the appropriate buttons of remote control device 5. Indeed, the present invention provides the capability of displaying table information, such as shown in FIGS. 8 and 9, or more detailed information relating to a particular program, such as shown in FIG. 10. These displays are superimposed on the video program then being received by the user's receiver/decoder, such video program being either a "normal" program or a "promotion" program, as has been described. Still further, the user may position a cursor at or adjacent a particular EPG still image and then, by operating the remote control device in the manner discussed above, the tuner included in the user's receiver/decoder is tuned to the broadcast channel identified by the EPG still image at which the cursor is positioned.

While the present invention has been particularly shown and described with reference to preferred embodiments as well as alternatives thereto, it will be readily appreciated by those of ordinary skill in the art that various changes may be made to the invention disclosed herein without departing from the spirit and scope of this invention. It is intended that the appended claims be interpreted as including the embodiments which have been discussed above, the various alternatives which have been described as well as all equivalents thereto.

What is claimed is:

1. A method of transmitting an electronic program guide (EPG) to identify programs which are to be transmitted, comprising the steps of:

generating EPG data including image data representing images of reduced, less than normal, size to identify respective programs which are to be transmitted;

providing program data constituting at least one program currently being transmitted;

combining said EPG data and said program data; and transmitting the combined data;

wherein said EPG data further includes text data representing information associated with said identified programs;

wherein said EPG text data comprises program table data formed of title and broadcast data and program content data formed of description data;

wherein said program table data is associated with programs currently being transmitted and to be transmitted during a predetermined time period, and said program content data is associated with said programs currently being transmitted and to be transmitted during a portion of said predetermined time period; and wherein, upon receipt of said transmitted combined data, a user may select one of a plurality of images of a reduced size superimposed on a first displayed full size image, said title information for said selected image being displayed along with said plurality of reduced size images, and wherein upon further operation, said user may display a full size image associated with said selected image in place of said first displayed full size image, or display additional information regarding said selected image.

2. The method of claim 1 wherein said information comprising at least one of said title data identifying the title of a program to be transmitted, said broadcast data identifying date and time at which said program is to be transmitted and said description data providing a description of the program to be transmitted.

3. The method of claim 2, further comprising the steps of providing text data associated with said at least one program currently being transmitted, combining said text data with said EPG data and said program data; and transmitting the combined EPG data, program data and text data.

4. The method of claim 3 wherein said text data associated with said at least one program currently being transmitted comprises at least one of title data identifying the title of said program currently being transmitted, category data identifying a category type of the program currently being transmitted, and transmission channel data identifying the transmission channel over which said program is currently being transmitted.

5. The method of claim 2 wherein said step of providing program data comprises supplying video and audio data of plural programs, each being transmitted over a respective broadcast channel, and compressing said video and audio data to produce compressed program data of said plural programs.

6. The method of claim 5 wherein the step of combining comprises multiplexing the EPG image and text data with said compressed program data of said plural programs, and wherein the number of programs identified by said EPG data is substantially greater than the number of programs with which said EPG data is multiplexed.

7. The method of claim 6 wherein the step of generating EPG data includes updating said EPG data periodically.

8. The method of claim 1 wherein the step of providing program data comprises supplying groups of program data, each group including video and audio data associated with plural programs, each program being transmitted over a respective broadcast channel, and compressing the video and audio data of each group to produce groups of compressed program data; wherein the step of combining said EPG data and said program data comprises multiplexing said EPG data with each group of compressed program data to produce respective data output channels; and wherein the step of transmitting comprises supplying each data output channel to a respective satellite transponder for satellite transmission over respective transponder channels.

9. A method of receiving electronic program guide (EPG) and program data transmitted on plural broadcast channels, said EPG data including image data representing images of reduced, less than normal size to identify respective programs which currently are and will be transmitted on several broadcast channels and said program data including video and audio data of plural programs currently being transmitted on respective broadcast channels, said method comprising the steps of:

receiving the program data transmitted on different broadcast channels and the EPG data transmitted with said program data;

separating the receiving EPG data from the received program data;

storing the separated EPG data;

displaying a first program represented by the separated program data;

selectively retrieving said stored EPG data;

displaying said images of reduced, less than normal size represented by said retrieved EPG data, the reduced size images being displayed in superposition over the first displayed program; and wherein, a user may select one of said images of a reduced size superimposed on the first displayed program, said title information for said selected image being displayed along with said reduced size images, and wherein upon further operation, said user may display a new program associated with said selected image in place of said first displayed program, or display additional information regarding said selected image.

10. The method of claim 9 wherein said retrieved EPG data identifies respective programs which currently are being transmitted; and further comprising the steps of selecting one of the reduced size images and displaying the program identified by the selected reduced size image.

11. The method of claim 9 wherein the received EPG data further includes text data representing information associated with each program identified by said image data, said text data being selectively retrieved from said stored EPG data and displayed.

12. The method of claim 11 further comprising the steps of selecting one of the displayed reduced size images and displaying the selected reduced size image and the text data associated with the program identified by said selected reduced size image.

13. The method of claim 12 wherein said text data includes title data identifying the title of the associated program, broadcast data identifying date, time and broadcast channel at which said associated program is to be transmitted, and description data providing a description of said associated program.

14. The method of claim 11 wherein said text data comprises program table data formed of title, data, time and broadcast channel data for each of the respective programs to be transmitted.

15. The method of claim 14 wherein said text data additionally comprises program content data providing a summary of the content of each of the respective programs to be transmitted.

16. The method of claim 15 wherein the received EPG data is multiplexed with the received program data.

17. The method of claim 11 wherein at least one of the received broadcast channels is a promotional channel and the program data transmitted thereon is promotional video and audio data representing particular programs transmitted on several other broadcast channels.

18. The method of claim 17 wherein said text data is selectively retrieved and displayed in superposition over a promotional video display as a table of programs transmitted on non-promotional broadcast channels.

19. The method of claim 17 wherein said text data is selectively retrieved and displayed in superposition over a promotional video display as a table of programs to be transmitted on a selected non-promotional broadcast channel.

20. The method of claim 17 wherein said text data is selectively retrieved and displayed in superposition over a promotional video display as a description of a selected program to be transmitted on a non-promotional broadcast channel.

21. Apparatus for transmitting an electronic program guide (EPG) to identify programs which are to be transmitted, comprising:

generating means for generating EPG data including image data representing images of reduced, less than normal, size to identify respective programs which are to transmitted;

a source of program data constituting at least one program currently being transmitted;

combining means for combining said EPG data and said program data; and transmission means for transmitting the combined data;

wherein said EPG data further includes text data representing information associated with said identified programs;

wherein said EPG text data includes program table data formed of title and broadcast data and program content data formed of description data;

wherein said program table data is associated with programs currently being transmitted and to be transmitted during a predetermined time period, and said program content data is associated with said programs currently being transmitted and to be transmitted during a portion of said predetermined time period; and wherein, upon receipt of said transmitted combined data, a user may select one of a plurality of images of a reduced size superimposed on a first displayed full size image, said title information for said selected image being displayed along with said plurality of reduced size images, and wherein upon further operation, said user may display a full size image associated with said selected image in place of said first displayed full size image, or display additional information regarding said selected image.

22. The apparatus of claim 21 wherein said information comprises at least one of said title data identifying the title of a program to be transmitted, said broadcast data identifying date and time at which said program is to be transmitted and said description data providing a description of the program to be transmitted.

23. The apparatus of claim 22, further comprising means for generating text data associated with said at least one program currently being transmitted; and means for combining said text data with said EPG data and said program data; and wherein said transmission means transmits the combined EPG data, program data and text data.

24. The apparatus of claim 23 wherein said text data associated with said at least one program comprises at least one of title data identifying the title of the program currently being transmitted, category data identifying a category type of the program currently being transmitted, and transmission channel data identifying the transmission channel over which said program is currently being transmitted.

25. The apparatus of claim 22 wherein said source of program data comprises means for supplying video and audio data of plural programs, each being transmitted over a respective broadcast channel, and data compression means for compressing said video and audio data to produce compressed program data of said plural programs.

26. The apparatus of claim 25 wherein said combining means comprises multiplexing means for multiplexing the EPG image and text data with said compressed program data of said plural programs, and wherein the number of programs identified by said EPG data is substantially greater than the number of programs with which said EPG data is multiplexed.

27. The apparatus of claim 26 wherein said generating means is operable to update said EPG data periodically.

28. The apparatus of claim 21 wherein said source of program data comprises means for supplying groups of program data, each group including video and audio data associated with plural programs, each program being transmitted over a respective broadcast channel, and means for compressing the video and audio data of each group to produce groups of compressed program data; wherein said combining means comprises means for multiplexing said EPG data with each group of compressed program data to produce respective data output channels; and wherein said transmission means comprises satellite transponders and means supplying each data output channel to a respective satellite transponder for satellite transmission over respective transponder channels.

29. Apparatus for receiving electronic program guide (EPG) and program data transmitted on plural broadcast channels, said EPG data including image data representing images of reduced, less than normal size to identify respective programs which currently are and will be transmitted on several broadcast channels and said program data including video and audio data of plural programs currently being transmitted on respective broadcast channels, said apparatus comprising:

receiving means for receiving the program data transmitted on different broadcast channels and the EPG data transmitted with said program data;

separating means for separating the received EPG data from the received program data;

storage means for storing the separated EPG data;

display means for displaying a first program represented by the separated program data;

read-out means for selectively retrieving said EPG data from said storage means;

means for displaying on said display means said images of reduced, less than normal size represented by said retrieved EPG data in superposition over the first displayed program; and wherein, a user may select one of said images of a reduced size superimposed on the first displayed program, said title information for said selected image being displayed along with said reduced size images, and wherein upon further operation, said user may display a new program associated with said selected image in place of said first displayed program, or display additional information regarding said selected image.

30. The apparatus of claim 29 wherein the received EPG data further includes text data representing information associated with each program identified by said image data; and said read-out means is operable to retrieve said text data from said storage means and supply the retrieved text data to said display means.

31. The apparatus of claim 30 further comprising image selecting means for selecting one of the displayed reduced size images to cause said read-out means to retrieve from said storage means the text data associated with the program identified by said selected reduced size image for display therewith.

32. The apparatus of claim 31 wherein said text data includes title data identifying the title of the associated program, broadcast data identifying data, time and broadcast channel at which said associated program is to be transmitted, and description data providing a description of said associated program.

33. The apparatus of claim 30 wherein said text data comprises program table data formed of title, data, time and broadcast channel data for each of the respective programs to be transmitted.

34. The apparatus of claim 33 wherein said text data additionally comprises program content data providing a summary of the content of each of the respective programs to be transmitted.

35. The apparatus of claim 34 wherein the received EPG data is multiplexed with the received program data.

36. The apparatus of claim 30 wherein at least one of the received broadcast channels is a promotional channel and the program data transmitted thereon is promotional video and audio data representing particular programs transmitted on several other broadcast channels.

37. The apparatus of claim 36 wherein said display means is operable to display the retrieved text data in superposition over a promotional video display as a table of programs transmitted on non-promotional broadcast channels.

38. The apparatus of claim 36 wherein said display means is operable to display the retrieved text data in superposition over a promotional video display as a table of programs to be transmitted on a selected non-promotional broadcast channel.

39. The apparatus of claim 36 wherein said display means is operable to display the retrieved text data in superposition over a promotional video display as a description of a selected program to be transmitted on a non-promotional broadcast channel.

40. The apparatus of claim 29 wherein said retrieved EPG data identifies respective programs which currently are being transmitted; and further comprising image selecting means for selecting one of the displayed reduced size images and tuning means for tuning said apparatus to the broadcast channel which transmits the program identified by the selected reduced size image.

41. A method of transmitting and receiving an electronic program guide (EPG) to identify programs which are to be transmitted, comprising the steps of:

generating EPG data including image data representing images of reduced, less than normal, size to identify respective programs which are to be transmitted;

providing program data constituting at least one program currently being transmitted;

combining said EPG data and said program data;

transmitting the combined data;

receiving the combined program and EPG data;

separating the received EPG data from the received program data;

storing the separated EPG data;

displaying a first program represented by the separated program data;

selectively retrieving said stored EPG data;

displaying said images of reduced, less than normal size represented by said retrieved EPG data, the reduced size images being displayed in superposition over the first displayed program; and wherein, a user may select one of said images of a reduced size superimposed on the first displayed program, said title information for said selected image being displayed along with said reduced size images, and wherein upon further operation, said user may display a new program associated with said selected image in place of said first displayed program, or display additional information regarding said selected image.

42. The method of claim 41 wherein said EPG data further includes text data representing information associated with said identified programs, said information comprising at least one of title data identifying the title of a program to be transmitted, broadcast data identifying date and time at which said program is to be transmitted and description data providing a description of the program to be transmitted.

43. The method of claim 41 further comprising the steps of selecting one of the displayed reduced size images and displaying the program identified by the selected reduced size image.

44. The method of claim 43 wherein the EPG data further includes text data representing information associated with each program identified by said image data, said text data being selectively retrieved from said stored EPG data and displayed; and further comprising the step of displaying the selected reduced size image and the text data associated with the program identified by said selected reduced size image.

45. The method of claim 41 wherein plural broadcast channels of program data are transmitted; and at least one of the received broadcast channels is a promotional channel and the program data transmitted thereon is promotional video and audio data representing particular programs transmitted on several other broadcast channels.

46. Apparatus for transmitting and receiving an electronic guide (EPG) to identify programs which are to be transmitted, comprising:

generating means for generating EPG data including image data representing images of reduced, less than normal, size to identify respective programs which are to be transmitted;

a source of program data constituting at least one program currently being transmitted;

combining means for combining said EPG data and said program data;

transmission means for transmitting the combined data;

receiving means for receiving the combined program and EPG data;

separating means for separating the received EPG data from the received program data;

storage means for storing the separated EPG data;

display means for displaying a first program represented by the separated program data;

read-out means for selectively retrieving said EPG data from said storage means;

means for displaying on said display means said images of reduced, less than normal size represented by said retrieved EPG data in superposition over the first displayed program; and wherein, a user may select one of said images of a reduced size superimposed on the first displayed program, said title information for said selected image being displayed along with said reduced size images, and wherein upon further operation, said user may display a new program associated with said selected image in place of said first displayed program, or display additional information regarding said selected image.

47. The apparatus of claim 46 wherein said EPG data further includes text data representing information associated with said identified programs, said information comprising at least one of title data identifying the title of a program to be transmitted, broadcast data identifying date and time at which said program is to be transmitted and description data providing a description of the program to be transmitted.

48. The apparatus of claim 47 further comprising image selecting means for selecting one of the displayed reduced size images to cause said read-out means to retrieve from said storage means the text data associated with the program identified by said selected reduced size image for display therewith.

49. A method of transmitting an electronic program guide (EPG) to identify programs which are to be transmitted, comprising the steps of:

generating EPG data including image data representing images of reduced, less than normal, size to identify respective programs which are to transmitted and text data representing information associated with said identified programs, said information comprising at least one of title data identifying the title of a program to be transmitted, broadcast data identifying date and time at which said program is to be transmitted and description data providing a description of the program to be transmitted, in which the step of generating EPG data includes updating said EPG data periodically;

providing program data constituting at least one program currently being transmitted, in which said step of providing program data comprises supplying video and audio data of plural programs, each being transmitted over a respective broadcast channel, and compressing said video and audio data to produce compressed program data of said plural programs;

combining said EPG data and said program data, in which the step of combining comprises multiplexing the EPG image and text data with said compressed program data of said plural programs; and transmitting the combined data;

wherein the number of programs identified by said EPG data is substantially greater than the number of programs with which said EPG data is multiplexed;

wherein said EPG text data comprises program table data formed of said title and broadcast data and program content data formed of said description data, in which said program table data is associated with programs currently being transmitted and to be transmitted during a predetermined time period and in which said program content data is associated with said programs currently being transmitted and to be transmitted during a fraction of said predetermined time period; and wherein, upon receipt of said transmitted combined data, a user may select one of a plurality of images of a reduced size superimposed on a first displayed full size image, said title information for said selected image being displayed along with said plurality of reduced size images, and wherein upon further operation, said user may display a full size image associated with said selected image in place of said first displayed full size image, or display additional information regarding said selected image.

50. A method of transmitting an electronic program guide (EPG) to identify programs which are to be transmitted, comprising the steps of:

generating EPG data including image data representing images of reduced, less than normal, size to identify respective programs which are to be transmitted and text data representing information associated with said identified programs, said information comprising at least one of title data identifying the title of a program to be transmitted, broadcast data identifying date and time at which said program is to be transmitted and description data providing a description of the program to be transmitted;

providing program data constituting at least one program currently being transmitted;

combining said EPG data and said program data; and transmitting the combined data;

wherein said program data is provided by supplying audio data and a single frame of video data of respective programs to form promotional programs data, each promotional program being transmitted over a respective broadcast channel, and compressing said audio and video data to produce compressed promotional program data of plural promotional programs;

wherein said EPG data and the compressed promotional data are combined by multiplexing the EPG image and text data with said compressed promotional data, the title and broadcast data of said EPG text data constituting program table data and the description data of said EPG text data constituting program content data, such that the multiplexed program table data is associated with programs currently being transmitted and to be transmitted during a predetermined time period and the multiplexed program content data is associated with said programs currently being transmitted and to be transmitted during a fraction of said predetermined time period; and wherein, upon receipt of said transmitted combined data, a user may select one of a plurality of images of a reduced size superimposed on a first displayed full size image, said title information for said selected image being displayed along with said plurality of reduced size images, and wherein upon further operation, said user may display a full size image associated with said selected image in place of said first displayed full size image, or display additional information regarding said selected image.

51. A method of receiving electronic program guide (EPG) and program data transmitted on plural broadcast channels, said EPG data including image data representing images of reduced, less than normal size to identify respective programs which currently are and will be transmitted on several broadcast channels and said program data including video and audio data of plural programs currently being transmitted on respective broadcast channels, said method comprising the steps of:

receiving the program data transmitted on different broadcast channels and the EPG data transmitted with said program data;

separating the received EPG data from the received program data;

storing the separated EPG data;

displaying a first program represented by the separated program data;

selectively retrieving said stored EPG data; and displaying said images of reduced, less than normal size represented by said retrieved EPG data, the reduced size images being displayed in superposition over the first displayed program;

wherein the received EPG data further includes text data representing information associated with each program identified by said image data, said text data comprising program table data formed of title, data, time and broadcast channel data for each of the respective programs to be transmitted and program content data providing a summary of the content of each of the respective programs to be transmitted and said text data being selectively retrieved from said stored EPG data and displayed;

wherein said program table data is associated with programs currently being transmitted and programs to be transmitted during a predetermined time period, and said program content data is associated with said programs currently being transmitted and said programs to be transmitted during a fraction of said predetermined time period; and wherein, a user may select one of said images of a reduced size superimposed on the first displayed program, said title information for said selected image being displayed along with said reduced size images, and wherein upon further operation, said user may display a new program associated with said selected image in place of said first displayed program, or display additional information regarding said selected image.

52. A method of receiving electronic program guide (EPG) and program data transmitted on plural broadcast channels, said EPG data including image data representing images of reduced, less than normal size to identify respective programs which currently are and will be transmitted on several broadcast channels and said program data including video and audio data of plural programs currently being transmitted on respective broadcast channels, said method comprising the steps of:

receiving the program data transmitted on different broadcast channels and the EPG data transmitted with said program data;

separating the received EPG data from the received program data;

storing the separated EPG data;

displaying a first program represented by the separated program data;

selectively retrieving said stored EPG data; and displaying said images of reduced, less than normal size represented by said retrieved EPG data, the reduced size images being displayed in superposition over the first displayed program;

wherein the received EPG data further includes text data representing information associated with each program identified by said image data, said text data comprising program table data formed of title, time and broadcast channel data for each of the respective programs to be transmitted and program content data providing a summary of the content of each of the respective programs to be transmitted and said text data being selectively retrieved from said stored EPG data and displayed;

wherein the received program data is compressed and is multiplexed with the received EPG data;

wherein the step of receiving the program data includes the step of expanding the compressed program data; and wherein, a user may select one of said images of a reduced size superimposed on the first displayed program, said title information for said selected image being displayed along with said reduced size images, and wherein upon further operation, said user may display a new program associated with said selected image in place of said first displayed program, or display additional information regarding said selected image.

53. A method of receiving electronic program guide (EPG) and program data transmitted on plural broadcast channels, said EPG data including image data representing images of reduced, less than normal size to identify respective programs which currently are and will be transmitted on several broadcast channels and said program data including video and audio data of plural programs currently being transmitted on respective broadcast channels, said method comprising the steps of:

receiving the program data transmitted on different broadcast channels and the EPG data transmitted with said program data;

separating the received EPG data from the received program data;

storing the separated EPG data;

displaying a first program represented by the separated program data;

selectively retrieving said stored EPG data; and displaying said images of reduced, less than normal size represented by said retrieved EPG data, the reduced size images being displayed in superposition over the first displayed program;

wherein the received EPG data further includes text data representing information associated with each program identified by said image data, said text data comprising program table data formed of title, time and broadcast channel data for each of the respective programs to be transmitted and program content data providing a summary of the content of each of the respective programs to be transmitted and said text data being selectively retrieved from said stored EPG data and displayed;

wherein the received EPG data is multiplexed with the received program data;

wherein the EPG data and program data are received via satellite transmission channels, each satellite transmission channel comprising plural broadcast channels multiplexed with the EPG data;

wherein the step of separating comprises demultiplexing each satellite transmission channel to recover said EPG data and the program data transmitted on each of said broadcast channels; and wherein, a user may select one of said images of a reduced size superimposed on the first displayed program, said title information for said selected image being displayed along with said reduced size images, and wherein upon further operation, said user may display a new program associated with said selected image in place of said first displayed program, or display additional information regarding said selected image.

54. The method of claim 53 further comprising the step of storing the recovered program data transmitted on each broadcast channel; and wherein the step of displaying a program comprises selecting the stored program data that had been transmitted on a desired broadcast channel, and displaying said selected program data.

55. A method of receiving electronic program guide (EPG) and program data transmitted on plural broadcast channels, said EPG data including image data representing images of reduced, less than normal size to identify respective programs which currently are and will be transmitted on several broadcast channels and said program data including video and audio data of plural programs currently being transmitted on respective broadcast channels, said method comprising the steps of:

receiving the program data transmitted on different broadcast channels and the EPG data transmitted with said program data, in which the received EPG data further includes text data representing information associated with each program identified by said image data;

separating the received EPG data from the received program data;

storing the separated EPG data;

displaying a first program represented by the separated program data;

selectively retrieving said stored EPG data and selectively retrieving said text data from said stored EPG data;

displaying said images of reduced, less than normal size represented by said retrieved EPG data, the reduced size images being displayed in superposition over the first displayed program and displaying the text data selectively retrieved from said stored EPG data;

displaying a text window superimposed over said first displayed program;

selecting one of the displayed reduced size images;

displaying in said text window said text data representing information associated with the program identified by said selected reduced size image; and wherein, a user may select one of said images of a reduced size superimposed on the first displayed program, said title information for said selected image being displayed along with said reduced size images, and wherein upon further operation, said user may display a new program associated with said selected image in place of said first displayed program, or display additional information regarding said selected image.

56. The method of claim 55 wherein the text data displayed in said text window includes title of said identified program and broadcast channel over which said identified program is transmitted.

57. A method of receiving electronic program guide (EPG) and program data transmitted on plural broadcast channels, said EPG data including image data representing images of reduced, less than normal size to identify respective programs which currently are and will be transmitted on several broadcast channels and said program data including video and audio data of plural programs currently being transmitted on respective broadcast channels, said method comprising the steps of:

receiving the program data transmitted on different broadcast channels and the EPG data transmitted with said program data;

separating the received EPG data from the received program data;

storing the separated EPG data;

displaying a first program represented by the separated program data;

selectively retrieving said stored EPG data;

displaying said images of reduced, less than normal size represented by said retrieved EPG data, the reduced size images being displayed in superposition over the first displayed program;

pre-storing predetermined display indicia;

receiving as part of said EPG data access information for accessing selected display indicia;

reading out said selected display indicia in response to the received access information;

displaying said selected display indicia in superposition over said first displayed program; and wherein, a user may select one of said images of a reduced size superimposed on the first displayed program, said title information for said selected image being displayed along with said reduced size images, and wherein upon further operation, said user may display a new program associated with said selected image in place of said first displayed program, or display additional information regarding said selected image.

58. Apparatus for transmitting an electronic program guide (EPG) to identify programs which are to be transmitted, comprising:

generating means for generating EPG data including image data representing images of reduced, less than normal, size to identify respective programs which are to transmitted and text data representing information associated with said identified programs, said information comprising at least one of title data identifying the title of a program to be transmitted, broadcast data identifying date and time at which said program is to be transmitted and description data providing a description of the program to be transmitted, said generating means being operable to update said EPG data periodically;

a source of program data constituting at least one program currently being transmitted, said source of program data comprises means for supplying video and audio data of plural programs, each being transmitted over a respective broadcast channel, and data compression means for compressing said video and audio data to produce compressed program data of said plural programs;

combining means for combining said EPG data and said program data, said combining means comprising multiplexing means for multiplexing the EPG image and text data with said compressed program data of said plural programs; and transmission means for transmitting the combined data;

wherein the number of programs identified by said EPG data is substantially greater than the number of programs with which said EPG data is multiplexed;

wherein said EPG text data comprises program table data formed of said title and broadcast data and program content data formed of said description data, in which said program table data is associated with programs currently being transmitted and to be transmitted during a predetermined time period and in which said program content data is associated with said programs currently being transmitted and to be transmitted during a fraction of said predetermined time period; and wherein, upon receipt of said transmitted combined data, a user may select one of a plurality of images of a reduced size superimposed on a first displayed full size image, said title information for said selected image being displayed along with said plurality of reduced size images, and wherein upon further operation, said user may display a full size image associated with said selected image in place of said first displayed full size image, or display additional information regarding said selected image.

59. Apparatus for transmitting an electronic program guide (EPG) to identify programs which are to be transmitted, comprising:

generating means for generating EPG data including image data representing images of reduced, less than normal, size to identify respective programs which are to transmitted and text data representing information associated with said identified programs, said information comprising at least one of title data identifying the title of a program to be transmitted, broadcast data identifying date and time at which said program is to be transmitted and description data providing a description of the program to be transmitted;

a source of program data constituting at least one program currently being transmitted;

combining means for combining said EPG data and said program data; and transmission means for transmitting the combined data;

wherein said source of program data comprises promotion data generating means for supplying audio data and a single frame of video data of respective programs to form promotional programs data, each promotional program being transmitted over a respective broadcast channel, and promotion data compression means for compressing said audio and video data to produce compressed promotional program data of plural promotional programs;

wherein said combining means comprises multiplexing means for multiplexing the EPG image and text data with said compressed promotional data, the title and broadcast data of said EPG text data constituting program table data and the description data of said EPG text data constituting program content data, such that the multiplexed program table data is associated with programs currently being transmitted and to be transmitted during a predetermined time period and the multiplexed program content data is associated with said programs currently being transmitted and to be transmitted during a fraction of said predetermined time period; and wherein, upon receipt of said transmitted combined data, a user may select one of a plurality of images of a reduced size superimposed on a first displayed full size image, said title information for said selected image being displayed along with said plurality of reduced size images, and wherein upon further operation, said user may display a full size image associated with said selected image in place of said first displayed full size image, or display additional information regarding said selected image.

60. Apparatus for receiving electronic program guide (EPG) and program data transmitted on plural broadcast channels, said EPG data including image data representing images of reduced, less than normal size to identify respective programs which currently are and will be transmitted on several broadcast channels and text data representing information associated with each program identified by said image data and said program data including video and audio data of plural programs currently being transmitted on respective broadcast channels, said apparatus comprising:

receiving means for receiving the program data transmitted on different broadcast channels and the EPG data transmitted with said program data;

separating means for separating the received EPG data from the received program data;

storage means for storing the separated EPG data;

display means for displaying a first program represented by the separated program data;

read-out means for selectively retrieving said EPG data from said storage means, said read-out means being operable to retrieve said text data from said storage means and supply the retrieved text data to said display means;

means for displaying on said display means said images of reduced, less than normal size represented by said retrieved EPG data in superposition over the first displayed program;

image selecting means for selecting one of the displayed reduced size images to cause said read-out means to retrieve from said storage means the text data associated with the program identified by said selected reduced size image for display therewith, in which said image selecting means comprises a cursor and cursor control means operable by a user to position said cursor at a desired one of the displayed reduced size images and thereby select said desired reduced size image; and wherein, a user may select one of said images of a reduced size superimposed on the first displayed program, said title information for said selected image being displayed along with said reduced size images, and wherein upon further operation, said user may display a new program associated with said selected image in place of said first displayed program, or display additional information regarding said selected image.

61. Apparatus for receiving electronic program guide (EPG) and program data transmitted on plural broadcast channels, said EPG data including image data representing images of reduced, less than normal size to identify respective programs which currently are and will be transmitted on several broadcast channels and text data representing information associated with each program identified by said image data and said program data including video and audio data of plural programs currently being transmitted on respective broadcast channels, said apparatus comprising:

receiving means for receiving the program data transmitted on different broadcast channels and the EPG data transmitted with said program data;

separating means for separating the received EPG data from the received program data;

storage means for storing the separated EPG data;

display means for displaying a first program represented by the separated program data;

read-out means for selectively retrieving said EPG data from said storage means, said read-out means being operable to retrieve said text data from said storage means and supply the retrieved text data to said display means; and means for displaying on said display means said images of reduced, less than normal size represented by said retrieved EPG data in superposition over the first displayed program;

wherein said text data comprises program table data formed of title, data, time and broadcast channel data for each of the respective programs to be transmitted and program content data providing a summary of the content of each of the respective programs to be transmitted, in which said program table data is associated with programs currently being transmitted and programs to be transmitted during a predetermined time period and in which said program content data is associated with said programs currently being transmitted and said programs to be transmitted during a fraction of said predetermined time period; and wherein, a user may select one of said images of a reduced size superimposed on the first displayed program, said title information for said selected image being displayed along with said reduced size images, and wherein upon further operation, said user may display a new program associated with said selected image in place of said first displayed program, or display additional information regarding said selected image.

62. Apparatus for receiving electronic program guide (EPG) and program data transmitted on plural broadcast channels, said EPG data including image data representing images of reduced, less than normal size to identify respective programs which currently are and will be transmitted on several broadcast channels and text data representing information associated with each program identified by said image data and said program data including video and audio data of plural programs currently being transmitted on respective broadcast channels, said apparatus comprising:

receiving means for receiving the program data transmitted on different broadcast channels and the EPG data transmitted with said program data;

separating means for separating the received EPG data from the received program data;

storage means for storing the separated EPG data;

display means for displaying a first program represented by the separated program data;

read-out means for selectively retrieving said EPG data from said storage means, said read-out means being operable to retrieve said text data from said storage means and supply the retrieved text data to said display means; and means for displaying on said display means said images of reduced, less than normal size represented by said retrieved EPG data in superposition over the first displayed program;

wherein said text data comprises program table data formed of title, time and broadcast channel data for each of the respective programs to be transmitted and program content data providing a summary of the content of each of the respective programs to be transmitted;

wherein the received program data is compressed and multiplexed with the received EPG data;

wherein the receiving means includes decompressing means for expanding the compressed program data; and wherein, a user may select one of said images of a reduced size superimposed on the first displayed program, said title information for said selected image being displayed along with said reduced size images, and wherein upon further operation, said user may display a new program associated with said selected image in place of said first displayed program, or display additional information regarding said selected image.

63. Apparatus for receiving electronic program guide (EPG) and program data transmitted on plural broadcast channels, said EPG data including image data representing images of reduced, less than normal size to identify respective programs which currently are and will be transmitted on several broadcast channels and text data representing information associated with each program identified by said image data and said program data including video and audio data of plural programs currently being transmitted on respective broadcast channels, said apparatus comprising:

receiving means for receiving the program data transmitted on different broadcast channels and the EPG data transmitted with said program data;

separating means for separating the received EPG data from the received program data;

storage means for storing the separated EPG data;

display means for displaying a first program represented by the separated program data;

read-out means for selectively retrieving said EPG data from said storage means, said read-out means being operable to retrieve said text data from said storage means and supply the retrieved text data to said display means; and means for displaying on said display means said images of reduced, less than normal size represented by said retrieved EPG data in superposition over the first displayed program;

wherein said text data comprises program table data formed of title, data, time and broadcast channel data for each of the respective programs to be transmitted and program content data providing a summary of the content of each of the respective programs to be transmitted;

wherein the received EPG data is multiplexed with the received program data;

wherein the EPG data and program data are received via satellite transmission channels, each satellite transmission channel comprising plural broadcast channels multiplexed with the EPG data;

wherein the separating means comprises demultiplexing means for demultiplexing each satellite transmission channel to recover said EPG data and the program data transmitted on each of said broadcast channels; and wherein, a user may select one of said images of a reduced size superimposed on the first displayed program, said title information for said selected image being displayed along with said reduced size images, and wherein upon further operation, said user may display a new program associated with said selected image in place of said first displayed program, or display additional information regarding said selected image.

64. The apparatus of claim 63 further comprising tuning means for tuning said apparatus to a selected broadcast channel; memory means for storing the recovered program data transmitted on the selected broadcast channel; and means for reading out the program data stored in said memory means and supplying same to said display means to display said read out program data.

65. Apparatus for receiving electronic program guide (EPG) and program data transmitted on plural broadcast channels, said EPG data including image data representing images of reduced, less than normal size to identify respective programs which currently are and will be transmitted on several broadcast channels and said program data including video and audio data of plural programs currently being transmitted on respective broadcast channels, said apparatus comprising:

a memory for pre-storing predetermined display indicia;

receiving means for receiving the program data transmitted on different broadcast channels and the EPG data transmitted with said program data, said receiving means being operable to receive as part of said EPG data access information for accessing selected display indicia;

separating means for separating the received EPG data from the received program data;

storage means for storing the separated EPG data;

display means for displaying a first program represented by the separated program data;

read-out means for selectively retrieving said EPG data from said storage means, said read-out means being operable to read out said selected display indicia in response to the received access information;

means for displaying on said display means said images of reduced, less than normal size represented by said retrieved EPG data in superposition over the first displayed program, said display means being operable to display said selected display indicia in superposition over said first displayed program; and wherein, a user may select one of said images of a reduced size superimposed on the first displayed program, said title information for said selected image being displayed along with said reduced size images, and wherein upon further operation, said user may display a new program associated with said selected image in place of said first displayed program, or display additional information regarding said selected image.

66. Apparatus for receiving electronic program guide (EPG) and program data transmitted on plural broadcast channels, said EPG data including image data representing images of reduced, less than normal size to identify respective programs which currently are and will be transmitted on several broadcast channels and text data representing information associated with each program identified by said image data and said program data including video and audio data of plural programs currently being transmitted on respective broadcast channels, said apparatus comprising:

receiving means for receiving the program data transmitted on different broadcast channels and the EPG data transmitted with said program data;

separating means for separating the received EPG data from the received program data;

storage means for storing the separated EPG data;

display means for displaying a first program represented by the separated program data, said display means being operable to display a text window superimposed over the first displayed program;

read-out means for selectively retrieving said EPG data from said storage means, said read-out means being operable to retrieve said text data from said storage means and supply the retrieved text data to said display means;

means for displaying on said display means said images of reduced, less than normal size represented by said retrieved EPG data in superposition over the first displayed program;

image selecting means for selecting one of the displayed reduced size images to cause said read-out means to retrieve said text data representing information associated with the program identified by said selected reduced size image for display in said text window; and wherein, a user may select one of said images of a reduced size superimposed on the first displayed program, said title information for said selected image being displayed along with said reduced size images, and wherein upon further operation, said user may display a new program associated with said selected image in place of said first displayed program, or display additional information regarding said selected image.

67. The apparatus of claim 66 wherein the text data displayed in said text window includes title of said identified program and broadcast channel over which said identified program is transmitted.

68. A method of transmitting and receiving an electronic program guide (EPG) to identify programs which are to be transmitted, comprising the steps of:

generating EPG data including image data representing images of reduced, less than normal, size to identify respective programs which are to transmitted;

providing program data constituting at least one program currently being transmitted;

combining said EPG data and said program data;

transmitting the combined data;

receiving the combined program and EPG data;

separating the received EPG data from the received program data;

storing the separated EPG data;

displaying a first program represented by the separated program data;

selectively retrieving said stored EPG data; and displaying said images of reduced, less than normal size represented by said retrieved EPG data, the reduced size images being displayed in superposition over the first displayed program;

wherein said EPG data further includes text data representing information associated with said identified programs, said information comprising at least one of title data identifying the title of a program to be transmitted, broadcast data identifying date and time at which said program is to be transmitted and description data providing a description of the program to be transmitted, wherein said step of providing program data comprises supplying video and audio data of plural programs, each being transmitted over a respective broadcast channel, and compressing said video and audio data to produce compressed program data of said plural programs; and wherein, a user may select one of said images of a reduced size superimposed on the first displayed program, said title information for said selected image being displayed along with said reduced size images, and wherein upon further operation, said user may display a new program associated with said selected image in place of said first displayed program, or display additional information regarding said selected image.

69. The method of claim 68 wherein the step of combining comprises multiplexing the EPG image and text data with said compressed program data of said plural programs, and wherein the number of programs identified by said EPG data is substantially greater than the number of programs with which said EPG data is multiplexed.

70. A method of transmitting and receiving an electronic program guide (EPG) to identify programs which are to be transmitted, comprising the steps of:

generating EPG data including image data representing images of reduced, less than normal, size to identify respective programs which are to be transmitted;

providing program data constituting at least one program currently being transmitted;

combining said EPG data and said program data;

transmitting the combined data;

receiving the combined program and EPG data;

separating the received EPG data from the received program data;

storing the separated EPG data;

displaying a first program represented by the separated program data;

selectively retrieving said stored EPG data; and displaying said images of reduced, less than normal size represented by said retrieved EPG data, the reduced size images being displayed in superposition over the first displayed program;

wherein said EPG data further includes text data representing information associated with said identified programs, said information comprising at least one of title data identifying the title of a program to be transmitted, broadcast data identifying date and time at which said program is to be transmitted and description data providing a description of the program to be transmitted, wherein said program data is provided by supplying audio data and a single frame of video data of respective programs to form promotional programs data, each promotional program being transmitted over a respective broadcast channel, and compressing said audio and video data to produce compressed promotional program data of plural promotional programs;

wherein said EPG data and the compressed promotional data are combined by multiplexing the EPG image and text data with said compressed promotional data, the title and broadcast data of said EPG text data constituting program table data and the description data of said EPG text data constituting program content data, such that the multiplexed program table data is associated with programs currently being transmitted and to be transmitted during a predetermined time period and the multiplexed program content data is associated with said programs currently being transmitted and to be transmitted during a fraction of said predetermined time period; and wherein, a user may select one of said images of a reduced size superimposed on the first displayed program, said title information for said selected image being displayed along with said reduced size images, and wherein upon further operation, said user may display a new program associated with said selected image in place of said first displayed program, or display additional information regarding said selected image.

71. A method of transmitting and receiving an electronic program guide (EPG) to identify programs which are to be transmitted, comprising the steps of:

generating EPG data including image data representing images of reduced, less than normal, size to identify respective programs which are to be transmitted;

providing program data constituting at least one program currently being transmitted;

combining said EPG data and said program data;

transmitting the combined data;

receiving the combined program and EPG data;

separating the received EPG data from the received program data;

storing the separated EPG data;

displaying a first program represented by the separated program data;

selectively retrieving said stored EPG data; and displaying said images of reduced, less than normal size represented by said retrieved EPG data, the reduced size images being displayed in superposition over the first displayed program;

wherein the step of providing program data comprises supplying groups of program data, each group including video and audio data associated with plural programs, each program being transmitted over a respective broadcast channel, and compressing the video and audio data of each group to produce groups of compressed program data;

wherein the step of combining said EPG data and said program data comprises multiplexing said EPG data with each group of compressed program data to produce respective data output channels;

wherein the step of transmitting comprises supplying each data output channel to a respective satellite transponder for satellite transmission over respective transponder channels; and wherein, a user may select one of said images of a reduced size superimposed on the first displayed program, said title information for said selected image being displayed along with said reduced size images, and wherein upon further operation, said user may display a new program associated with said selected image in place of said first displayed program, or display additional information regarding said selected image.

72. A method of transmitting and receiving an electronic program guide (EPG) to identify programs which are to be transmitted, comprising the steps of generating EPG data including image data representing images of reduced, less than normal, size to identify respective programs which are to transmitted; providing program data constituting at least one program currently being transmitted; combining said EPG data and said program data; transmitting the combined data; receiving the combined program and EPG data; separating the received EPG data from the received program data; storing the separated EPG data; displaying a first program represented by the separated program data; selectively retrieving said stored EPG data; displaying said images of reduced, less than normal size represented by said retrieved EPG data, the reduced size images being displayed in superposition over the first displayed program; selecting one of the displayed reduced size images and displaying the program identified by the selected reduced size image; wherein the EPG data further includes text data representing information associated with each program identified by said image data, said text data being selectively retrieved from said stored EPG data and displayed; and displaying the selected reduced size image and the text data associated with the program identified by said selected reduced size image; wherein the combined EPG and program data are multiplexed together and the received program data is compressed; wherein the step of receiving the program data includes the step of expanding the compressed program data; and wherein, a user may select one of said images of a reduced size superimposed on the first displayed program, said title information for said selected image being displayed along with said reduced size images, and wherein upon further operation, said user may display a new program associated with said selected image in place of said first displayed program, or display additional information regarding said selected image.

73. The method of claim 72 further comprising the step of storing the received program data; and wherein the step of displaying the program comprises selecting stored program data that had been transmitted on a desired broadcast channel, and displaying said selected program data.

74. A method of transmitting and receiving an electronic program guide (EPG) to identify programs which are to be transmitted, comprising the steps of generating EPG data including image data representing images of reduced, less than normal, size to identify respective programs which are to transmitted; providing program data constituting at least one program currently being transmitted; combining said EPG data and said program data; transmitting the combined data; receiving the combined program and EPG data; separating the received EPG data from the received program data; storing the separated EPG data; displaying a first program represented by the separated program data; selectively retrieving said stored EPG data; displaying said images of reduced, less than normal size represented by said retrieved EPG data, the reduced size images being displayed in superposition over the first displayed program; selecting one of the displayed reduced size images and displaying the program identified by the selected reduced size image; wherein the EPG data further includes text data representing information associated with each program identified by said image data, said text data being selectively retrieved from said stored EPG data and displayed; displaying the selected reduced size image and the text data associated with the program identified by said selected reduced size image; displaying a text window superimposed over said first displayed program; selecting one of the displayed reduced size images; displaying in said text window said text data representing information associated with the program identified by said selected reduced size image; and wherein, a user may select one of said images of a reduced size superimposed on the first displayed program, said title information for said selected image being displayed along with said reduced size images, and wherein upon further operation, said user may display a new program associated with said selected image in place of said first displayed program, or display additional information regarding said selected image.

75. The apparatus of claim 74 wherein said source of program data comprises promotion data generating means for supplying audio data and a single frame of video data of respective programs to form promotional programs data, each promotional program being transmitted over a respective broadcast channel, and promotion data compression means for compressing said audio and video data to produce compressed promotional program data of plural promotional programs; and wherein said combining means comprises multiplexing means for multiplexing the EPG image and text data with said compressed promotional data, the title and broadcast data of said EPG text data constituting program table data and the description data of said EPG text data constituting program content data, such that the multiplexed program table data is associated with programs currently being transmitted and to be transmitted during a predetermined time period and the multiplexed program content data is associated with said programs currently being transmitted and to be transmitted during a fraction of said predetermined time period.

76. A method of transmitting and receiving an electronic program guide (EPG) to identify programs which are to be transmitted, comprising the steps of:

generating EPG data including image data representing images of reduced, less than normal, size to identify respective programs which are to transmitted;

providing program data constituting at least one program currently being transmitted;

combining said EPG data and said program data;

pre-storing predetermined display indicia;

transmitting the combined data;

transmitting as part of said EPG data access information for accessing selected display indicia;

receiving the combined program and EPG data;

separating the received EPG data from the received program data;

storing the separated EPG data;

reading out said selected display indicia in response to received access information;

displaying a first program represented by the separated program data;

selectively retrieving said stored EPG data;

displaying said images of reduced, less than normal size represented by said retrieved EPG data, the reduced size images being displayed in superposition over the first displayed program;

displaying said selected display indicia in superposition over said displayed program; and wherein, a user may select one of said images of a reduced size superimposed on the first displayed program, said title information for said selected image being displayed along with said reduced size images, and wherein upon further operation, said user may display a new program associated with said selected image in place of said first displayed program, or display additional information regarding said selected image.

77. Apparatus for transmitting and receiving an electronic program guide (EPG) to identify programs which are to be transmitted, comprising:

generating means for generating EPG data including image data representing images of reduced, less than normal, size to identify respective programs which are to transmitted;

a source of program data constituting at least one program currently being transmitted;

combining means for combining said EPG data and said program data;

transmission means for transmitting the combined data;

receiving means for receiving the combined program and EPG data;

separating means for separating the received EPG data from the received program data;

storage means for storing the separated EPG data;

display means for displaying a first program represented by the separated program data;

read-out means for selectively retrieving said EPG data from said storage means; and means for displaying on said display means said images of reduced, less than normal size represented by said retrieved EPG data in superposition over the first displayed program, wherein said EPG data further includes text data representing information associated with said identified programs, said information comprising at least one of title data identifying the title of a program to be transmitted, broadcast data identifying date and time at which said program is to be transmitted and description data providing a description of the program to be transmitted, wherein said source of program data comprises means for supplying video and audio data of plural programs, each being transmitted over a respective broadcast channel, and data compression means for compressing said video and audio data to produce compressed program data of said plural programs; and wherein, a user may select one of said images of a reduced size superimposed on the first displayed program, said title information for said selected image being displayed along with said reduced size images, and wherein upon further operation, said user may display a new program associated with said selected image in place of said first displayed program, or display additional information regarding said selected image.

78. The apparatus of claim 77 wherein said combining means comprises multiplexing means for multiplexing the EPG image and text data with said compressed program data of said plural programs, and wherein the number of programs identified by said EPG data is substantially greater than the number of programs with which said EPG data is multiplexed.

79. Apparatus for transmitting and receiving an electronic program guide (EPG) to identify programs which are to be transmitted, comprising:

generating means for generating EPG data including image data representing images of reduced, less than normal, size to identify respective programs which are to transmitted;

a source of program data constituting at least one program currently being transmitted;

combining means for combining said EPG data and said program data;

transmission means for transmitting the combined data;

receiving means for receiving the combined program and EPG data;

separating means for separating the received EPG data from the received program data;

storage means for storing the separated EPG data;

display means for displaying a first program represented by the separated program data;

read-out means for selectively retrieving said EPG data from said storage means; and means for displaying on said display means said images of reduced, less than normal size represented by said retrieved EPG data in superposition over the first displayed program;

wherein said source of program data comprises means for supplying groups of program data, each group including video and audio data associated with plural programs, each program being transmitted over a respective broadcast channel, and means for compressing the video and audio data of each group to produce groups of compressed program data;

wherein said combining means comprises means for multiplexing said EPG data with each group of compressed program data to produce respective data output channels;

wherein said transmission means comprises satellite transponders and means supplying each data output channel to a respective satellite transponder for satellite transmission over respective transponder channels; and wherein, a user may select one of said images of a reduced size superimposed on the first displayed program, said title information for said selected image being displayed along with said reduced size images, and wherein upon further operation, said user may display a new program associated with said selected image in place of said first displayed program, or display additional information regarding said selected image.

80. Apparatus for transmitting and receiving an electronic program guide (EPG) to identify programs which are to be transmitted, comprising generating means for generating EPG data including image data representing images of reduced, less than normal, size to identify respective programs which are to transmitted; a source of program data constituting at least one program currently being transmitted; combining means for combining said EPG data and said program data; transmission means for transmitting the combined data; receiving means for receiving the combined program and EPG data; separating means for separating the received EPG data from the received program data; storage means for storing the separated EPG data; display means for displaying a first program represented by the separated program data; read-out means for selectively retrieving said EPG data from said storage means; means for displaying on said display means said images of reduced, less than normal size represented by said retrieved EPG data in superposition over the first displayed program; wherein said EPG data further includes text data representing information associated with said identified programs, said information comprising at least one of title data identifying the title of a program to be transmitted, broadcast data identifying date and time at which said program is to be transmitted and description data providing a description of the program to be transmitted; image selecting means for selecting one of the displayed reduced size images to cause said read-out means to retrieve from said storage means the text data associated with the program identified by said selected reduced size image for display therewith, wherein said image selecting means comprises a cursor and cursor control means operable by a user to position said cursor at a desired one of the displayed reduced size images and thereby select said desired reduced size image; and wherein, a user may select one of said images of a reduced size superimposed on the first displayed program, said title information for said selected image being displayed along with said reduced size images, and wherein upon further operation, said user may display a new program associated with said selected image in place of said first displayed program, or display additional information regarding said selected image.

81. The apparatus of claim 80 wherein the combined EPG and program data are multiplexed together and the received program data is compressed; and wherein the receiving means includes decompressing means for expanding the compressed program data.

82. The apparatus of claim 81 wherein the transmission means transmits the EPG data and program data via satellite transmission channels, each satellite transmission channel comprising plural broadcast channels multiplexed with the EPG data; and wherein the separating means comprises demultiplexing means for demultiplexing each satellite transmission channel to recover said EPG data and the program data transmitted on each of said broadcast channels.

83. The apparatus of claim 82 further comprising tuning means for tuning said apparatus to a selected broadcast channel; memory means for storing the recovered program data transmitted on the selected broadcast channel; and means for reading out the program data stored in said memory means and supplying same to said display means to display said read out program data.

84. The apparatus of claim 82 wherein at least one of the transmitted broadcast channels is a promotional channel and the program data transmitted thereon is promotional video and audio data representing particular programs transmitted on several other broadcast channels.

85. Apparatus for transmitting and receiving an electronic program guide (EPG) to identify programs which are to be transmitted, comprising:

generating means for generating EPG data including image data representing images of reduced, less than normal, size to identify respective programs which are to transmitted;

a source of program data constituting at least one program currently being transmitted;

combining means for combining said EPG data and said program data;

transmission means for transmitting the combined data; receiving means for receiving the combined program and EPG data;

separating means for separating the received EPG data from the received program data;

storage means for storing the separated EPG data;

display means for displaying a first program represented by the separated program data;

read-out means for selectively retrieving said EPG data from said storage means; and means for displaying on said display means said images of reduced, less than normal size represented by said retrieved EPG data in superposition over the first displayed program;

wherein said storage means includes a memory for pre-storing predetermined display indicia, said generating means being operable to generate as part of said EPG data access information for accessing selected display indicia, said read-out means being operable to read out said selected display indicia in response to received access information, and said display means being operable to display said selected display indicia in superposition over said first displayed program; and wherein, a user may select one of said images of a reduced size superimposed on the first displayed program, said title information for said selected image being displayed along with said reduced size images, and wherein upon further operation, said user may display a new program associated with said selected image in place of said first displayed program, or display additional information regarding said selected image.

86. Apparatus for transmitting and receiving an electronic program guide (EPG) to identify programs which are to be transmitted, comprising generating means for generating EPG data including image data representing images of reduced, less than normal, size to identify respective programs which are to transmitted; a source of program data constituting at least one program currently being transmitted; combining means for combining said EPG data and said program data; transmission means for transmitting the combined data; receiving means for receiving the combined program and EPG data; separating means for separating the received EPG data from the received program data; storage means for storing the separated EPG data; display means for displaying a first program represented by the separated program data; read-out means for selectively retrieving said EPG data from said storage means; means for displaying on said display means said images of reduced, less than normal size represented by said retrieved EPG data in superposition over the first displayed program; wherein said EPG data further includes text data representing information associated with said identified programs, said information comprising at least one of title data identifying the title of a program to be transmitted, broadcast data identifying date and time at which said program is to be transmitted and description data providing a description of the program to be transmitted and wherein said display means is operable to display a text window superimposed over said first displayed program; and further comprising image selecting means for selecting one of the displayed reduced size images to cause said read-out means to retrieve said text data representing information associated with the program identified by said selected reduced size image for display in said text window; and wherein, a user may select one of said images of a reduced size superimposed on the first displayed program, said title information for said selected image being displayed along with said reduced size images, and wherein upon further operation, said user may display a new program associated with said selected image in place of said first displayed program, or display additional information regarding said selected image.

* * * * *